US012634635B2

(12) United States Patent
Ye

(10) Patent No.: US 12,634,635 B2
(45) Date of Patent: May 19, 2026

(54) SOUND APPARATUS

(71) Applicant: LG DISPLAY CO., LTD., Seoul (KR)

(72) Inventor: Jaehun Ye, Tokyo (JP)

(73) Assignee: LG Display Co., Ltd., Seoul (KR)

( * ) Notice: Subject to any disclaimer, the term of this patent is extended or adjusted under 35 U.S.C. 154(b) by 152 days.

(21) Appl. No.: 18/750,496

(22) Filed: Jun. 21, 2024

(65) Prior Publication Data

US 2025/0008273 A1 Jan. 2, 2025

(30) Foreign Application Priority Data

Jun. 29, 2023 (JP) ................................ 2023-107566

(51) Int. Cl.
*H04R 17/00* (2006.01)
*H04R 1/02* (2006.01)
*H04R 7/04* (2006.01)

(52) U.S. Cl.
CPC ............. *H04R 17/00* (2013.01); *H04R 1/028* (2013.01); *H04R 7/04* (2013.01); *H04R 2499/15* (2013.01)

(58) Field of Classification Search
CPC .......... H04R 17/00; H04R 1/028; H04R 7/04; H04R 2499/15; H04R 7/045; H04R 7/06; H04R 7/16
See application file for complete search history.

(56) References Cited

U.S. PATENT DOCUMENTS

| | | | | |
|---|---|---|---|---|
| 12,432,488 B2 * | 9/2025 | Kim | ...................... | H04R 9/063 |
| 2021/0227329 A1 * | 7/2021 | Ogata | ...................... | H02N 2/04 |
| 2021/0392439 A1 * | 12/2021 | Ye | ...................... | H04R 17/00 |

(Continued)

FOREIGN PATENT DOCUMENTS

| | | |
|---|---|---|
| JP | 2021090141 A | 6/2021 |
| KR | 10-1323323 B1 | 10/2013 |

(Continued)

*Primary Examiner* — David L Ton
(74) *Attorney, Agent, or Firm* — Fish & Richardson P.C.

(57) ABSTRACT

A sound apparatus includes a vibration member having a plate shape; and a first vibration device, a plurality of second vibration devices, and a third vibration device configured to each have a plate shape including a first main surface and a second main surface opposite to each other and configured to vibrate based on a driving signal input thereto. The first main surface of the first vibration device may be connected to the vibration member, a portion of the second main surface of the first vibration device and a portion of the first main surface of the third vibration device may be connected to each other by an elastic member so that the first main surface of the third vibration device is spaced apart from and opposite to the second main surface of the first vibration device by a certain distance. A portion of each of the plurality of second vibration devices may be connected to a portion of the third vibration device and a portion of the first main surface of each of the plurality of second vibration devices may be connected to a portion of the vibration member by an elastic member, so that the plurality of second vibration devices extend radially from the third vibration device in a plane. A driving signal input to the first vibration device may have a phase opposite to a phase of a driving signal input to the third vibration device.

29 Claims, 12 Drawing Sheets

(56) References Cited

U.S. PATENT DOCUMENTS

| | | | | |
|---|---|---|---|---|
| 2022/0217472 | A1* | 7/2022 | Ye | H04R 17/00 |
| 2023/0209268 | A1* | 6/2023 | Ye | G06F 3/016<br>381/333 |
| 2023/0209276 | A1* | 6/2023 | Ye | H04R 7/04<br>381/190 |
| 2024/0214736 | A1* | 6/2024 | Ye | H04R 7/04 |
| 2024/0214738 | A1* | 6/2024 | Ye | H04R 1/028 |
| 2024/0215454 | A1* | 6/2024 | Hwang | H04R 17/00 |
| 2025/0008272 | A1* | 1/2025 | Ye | H04R 17/00 |

FOREIGN PATENT DOCUMENTS

| | | | |
|---|---|---|---|
| KR | 10-2288653 | B1 | 8/2021 |
| KR | 10-2310176 | B1 | 10/2021 |
| KR | 10-2320360 | B1 | 11/2021 |
| KR | 10-2370837 | B1 | 3/2022 |

* cited by examiner

SOUND APPARATUS

CROSS-REFERENCE TO RELATED APPLICATION

This application claims the priority of Japanese Patent Application No. 2023-107566 filed on Jun. 29, 2023, which is hereby incorporated by reference in its entirety.

BACKGROUND

Field of the Disclosure

The present disclosure relates to a sound apparatus.

Description of the Background

Vehicles include a sound apparatus which outputs a sound based on an audio signal output from a multimedia device such as a car audio device. For example, the sound apparatus applied to vehicles may include a front speaker and a rear speaker, which are configured as a coil type.

SUMMARY

Piezoelectric devices used to piezoelectric speakers are limited in vibration width (or displacement width), and due to this, there is a case where a sound pressure level is not sufficient.

The present disclosure has been implemented based on such a problem, and the inventor of present disclosure have performed extensive research and experiments for implementing a sound apparatus for enhancing sound quality. Based on the extensive research and experiments, the inventors have invented a new sound apparatus for enhancing sound quality. The present disclosure is directed to providing a sound apparatus in which sound quality is enhanced.

Additional features, advantages, and aspects will be set forth in the description that follows, and in part will be apparent from the description, or may be learned by practice of the inventive concepts provided herein. Other features, advantages, and aspects of the present disclosure may be realized and attained by the structure particularly pointed out in the written description, or derivable therefrom, and the claims hereof as well as the appended drawings.

To achieve these and other advantages and aspects of the present disclosure, as embodied and broadly described herein, in one or more aspects, a sound apparatus may comprise a vibration member having a plate shape; and a first vibration device, a plurality of second vibration devices, and a third vibration device configured to each have a plate shape including a first main surface and a second main surface opposite to each other and configured to vibrate based on a driving signal input thereto. The first main surface of the first vibration device may be connected to the vibration member, a portion of the second main surface of the first vibration device and a portion of the first main surface of the third vibration device may be connected to each other by an elastic member so that the first main surface of the third vibration device is spaced apart from and opposite to the second main surface of the first vibration device by a certain distance. A portion of each of the plurality of second vibration devices may be connected to a portion of the third vibration device and a portion of the first main surface of each of the plurality of second vibration devices may be connected to a portion of the vibration member by an elastic member, so that the plurality of second vibration devices extend radially from the third vibration device in a plane. A driving signal input to the first vibration device may have a phase opposite to a phase of a driving signal input to the third vibration device.

In one or more aspects, a sound apparatus may comprise a vibration member, a first vibration device connected to the vibration member, a third vibration device overlapping the first vibration device, a plurality of second vibration devices connected to the vibration member and connected to the third vibration device between the first vibration device and the third vibration device to be spaced apart from the first vibration device, a plurality of elastic members connected between the vibration member and each of the plurality of second vibration devices, and a plurality of connection members connected between the first vibration device and the third vibration device. A driving signal input to the first vibration device may have a phase which differs from a phase of a driving signal input to the third vibration device.

According to one or more aspects of the present disclosure, a sound apparatus where sound quality is enhanced may be provided. According to one or more aspects of the present disclosure, a sound apparatus where a sound characteristic and/or a sound pressure level characteristic of a sound of a low-pitched sound band may be enhanced may be provided.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and aspects of the disclosure and together with the description serve to explain principles and examples of the disclosure.

In the drawings.

Figure 1:
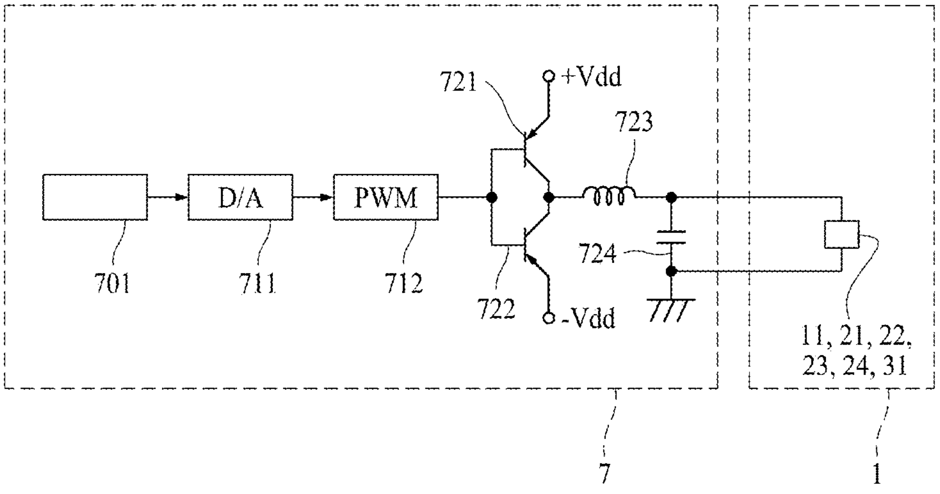
FIG. 1 illustrates a configuration of a sound apparatus and a host system according to a first aspect of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof may be exaggerated for clarity, illustration, and convenience.

DETAILED DESCRIPTION

Reference is now made in detail to aspects of the present disclosure, examples of which may be illustrated in the accompanying drawings. In the following description, when a detailed description of well-known methods, functions, structures or configurations may unnecessarily obscure aspects of the present disclosure, a detailed description of such known functions or configurations may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the aspects described with reference to the accompanying drawings. The present disclosure may, however, be embodied in different forms and should not be construed as limited to the example aspects set forth herein. Rather, these example aspects are examples and are provided so that this disclosure may be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

Where a term like "comprise," "have," "include," "contain," "constitute," "made of," "formed of," "composed of," or the like is used with respect to one or more elements (e.g., layers, films, regions, components, sections, members, parts, regions, areas, portions, steps, operations, and/or the like), one or more other elements may be added unless a term such as "only" or the like is used. The terms used in the present disclosure are merely used to describe particular example aspects, and are not intended to limit the scope of the present disclosure. The terms of a singular form may include plural forms unless the context clearly indicates otherwise.

The word "exemplary" is used to mean serving as an example or illustration, unless otherwise specified. Aspects are example aspects. In one or more implementations, "aspects," "examples," and the like should not be construed to be preferred or advantageous over other implementations. An aspect, an example, an example aspect, or the like may refer to one or more aspects, one or more examples, one or more example aspects, or the like, unless stated otherwise. Further, the term "may" encompass all the meanings of the term "may."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts may be located between the two parts unless a more limiting term, such as "immediate(ly)," "direct(ly)," or "close(ly)," is used. For example, where a structure is described as being positioned "on," "upon," "on top of," "over," "under," "above," "below," "beneath,"

"near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, may be used to describe a correlation between various elements (e. g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, may include all directions of "above" and "below." Likewise, an exemplary term "above" or "on" may include both directions of "above" and "below."

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

The terms, such as "below," "lower," "above," "upper" and the like, may be used herein to describe a relationship between element(s) as illustrated in the drawings. It will be understood that the terms are spatially relative and based on the orientation depicted in the drawings.

It is understood that, although the terms "first," "second," or the like may be used herein to describe various elements (e.g., layers, films, regions, components, sections, members, parts, regions, areas, portions, steps, operations, and/or the like), these elements should not be limited by these terms, for example, to any particular order, precedence, or number of elements. These terms are used only to distinguish one element from another. For example, a first element may denote a second element, and, similarly, a second element may denote a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e. g., layer, film, region, component, section, or the like) is described as "connected," "coupled," "attached," "adhered," or the like to another element, the element may not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e. g., layer, film, region, component, section, or the like) "contacts," "overlaps," or the like with another element, the element may not only directly contact, overlap, or the like with another element, but also indirectly contact, overlap, or the like with another element with one or more intervening elements disposed or interposed between the elements, unless otherwise specified.

The phrase that an element (e.g., layer, film, region, component, section, or the like) is "provided," "disposed," "connected," "coupled," or the like in, on, with or to another element may be understood as that at least a portion of the element is provided, disposed, connected, coupled, or the like in, on, with or to at least a portion of another element, or that the entirety of the element is provided, disposed, connected, coupled, or the like in another element. The phase that an element (e.g., layer, film, region, component, section, or the like) "contacts," "overlaps," or the like with another element may be understood, for example, as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other. Such terms may mean a wider range of lines or directions within which the components of the present disclosure may operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure may operate functionally.

The term "at least one" should be understood as including any and all combinations of one or more of the associated listed items. For example, each of the phrases of "at least one of a first item, a second item, or a third item" and "at least one of a first item, a second item, and a third item", may represent (i) a combination of items provided by one or more of the first item, the second item, and the third item or (ii) only one of the first item, the second item, and the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any of A, B, and C (e.g., A, B, or C); some combinations of A, B, and C (e.g., A and B; A and C; or B and C); and all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as different from one another. In another example, an expression "different from one another" may be understood as different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." For example, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various aspects of the present disclosure may be partially or entirely coupled to or combined with each other, may be technically associated with each other, and may be operated, linked, or driven together in various ways. Aspects of the present disclosure may be implemented or carried out independently from each other, or may be implemented or carried out together in a co-dependent or related relationship. In one or more aspects, the components of each apparatus according to various aspects of the present disclosure may be operatively coupled and configured.

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example aspects.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

"X-axis direction," "Y-axis direction," and "Z-axis direction," should not be construed by a geometric relation only of a mutual vertical relation and may have broader directionality within the range that elements of the present disclosure may act functionally.

In the following description, various example aspects of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings.

In addition, for convenience of description, a scale, dimension, size, and thickness of each of the elements illustrated in the accompanying drawings may be different from an actual scale, dimension, size, and thickness, and thus, aspects of the present disclosure are not limited to a scale, dimension, size, and thickness illustrated in the drawings.

First Aspect

FIG. 1 illustrates a configuration of a sound apparatus 1 according to the first aspect of the present disclosure. A driving signal (or a sound signal or a voice signal) input to the sound apparatus 1 will be described with reference to FIG. 1. The sound apparatus 1 may be individually used as a speaker, or may be embedded into an advertising signboard, a poster, a noticeboard, a vehicle, a building, or display apparatus or the like. The use of the sound apparatus 1 according to the aspect of the present disclosure is not particularly limited thereto.

The sound apparatus 1 may include a first vibration device 11, a plurality of second vibration devices 21 to 24, and a third vibration device 31. The first vibration device 11, the plurality of second vibration devices 21 to 24, and the third vibration device 31 may be a device which is displaced based on an inverse piezoelectric effect when a voltage is applied based on a driving signal input thereto. The first vibration device 11, the plurality of second vibration devices 21 to 24, and the third vibration device 31, for example, may be an element which is flexurally displaced based on a voltage such as bimorph, unimorph, or multimorph. An input driving signal may be an alternating current (AC) voltage, and thus, the first vibration device 11, the plurality of second vibration devices 21 to 24, and the third vibration device 31 may vibrate based on the input driving signal to generate a vibration and/or a sound. For example, the first vibration device 11, the plurality of second vibration devices 21 to 24, and the third vibration device 31 may be a vibration generating device, a sound generating device, a piezoelectric device, a vibration generator, a sound generator, a piezoelectric speaker, or a voice generating device. However, aspects of the present disclosure are not limited thereto.

A host system 7 may be a system including an apparatus or a plurality of apparatuses, which supply the driving signal to control the sound apparatus 1. However, the host system 7 may further supply other signals such as an image signal (for example, RGB data or RGBW data) and a timing signal (for example, a vertical synchronization signal, a horizontal synchronization signal, and a data enable signal, etc.) or the like based on the use of the sound apparatus 1. The host system 7 may be, for example, a source sound reproduction apparatus, a local broadcast apparatus, a radio broadcast reproduction system, a television (TV) system, a set-top box, a navigation system, an optical disk player, a computer, a home theater system, a video phone system, or the like. Further, the sound apparatus 1 and the host system 7 may be an integrated apparatus or separate apparatuses.

The host system 7 may include an input unit 701, a digital-to-analog (D/A) converter 711, a pulse width modulation (PWM) circuit 712, transistors 721 and 722, a coil 723, and a capacitor 724. The input unit 701 may input a digital signal to control the first vibration device 11, the plurality of second vibration devices 21 to 24, and the third vibration device 31. The D/A converter 711 may convert the digital signal input from the input unit 701 into an analog signal. The PWM circuit 712 may pulse-width-modulate the analog signal input from the D/A converter 711 to output a pulse signal. The transistors 721 and 722 may include a PNP type transistor 721 and an NPN type transistor 722. The PNP type transistor 721 and the NPN type transistor 722 may configure a push-pull circuit. For example, a collector terminal of each of the transistors 721 and 722 may be connected to each other, and a base terminal of each of the transistors 721 and 722 may be connected to each other. A positive voltage +Vdd may be applied to an emitter terminal of the transistor 721, and a negative voltage −Vdd may be applied to an emitter terminal of the transistor 722. The pulse signal from the PWM circuit 712 may be applied to the base terminals of the transistors 721 and 722, and the transistors 721 and 722 may be complementarily turned on or turned off based on the pulse signal. For example, when a positive pulse signal is applied to the base terminals of the transistors 721 and 722, the transistor 721 may be turned on and the transistor 722 may be turned off. Therefore, a voltage of the collector terminal of each of the transistors 721 and 722 may be a voltage +Vdd. On the other hand, when the negative pulse signal is applied to the base terminals of the transistors 721 and 722, the transistor 721 may be turned off and the transistor 722 may be turned on. Therefore, a voltage of the collector terminal of each of the transistors 721 and 722 may be a voltage −Vdd. Further, when a potential of the pulse signal is a ground potential, the transistors 721 and 722 may be turned off simultaneously. The coil 723 and the capacitor 724 may each function as a low pass filter and may smooth the pulse signal at the collector terminal of each of the transistors 721 and 722 to output to the first vibration device 11, the plurality of second vibration devices 21 to 24, and the third vibration device 31 as a driving signal (or a voice signal or a sound signal).

Figure 2:
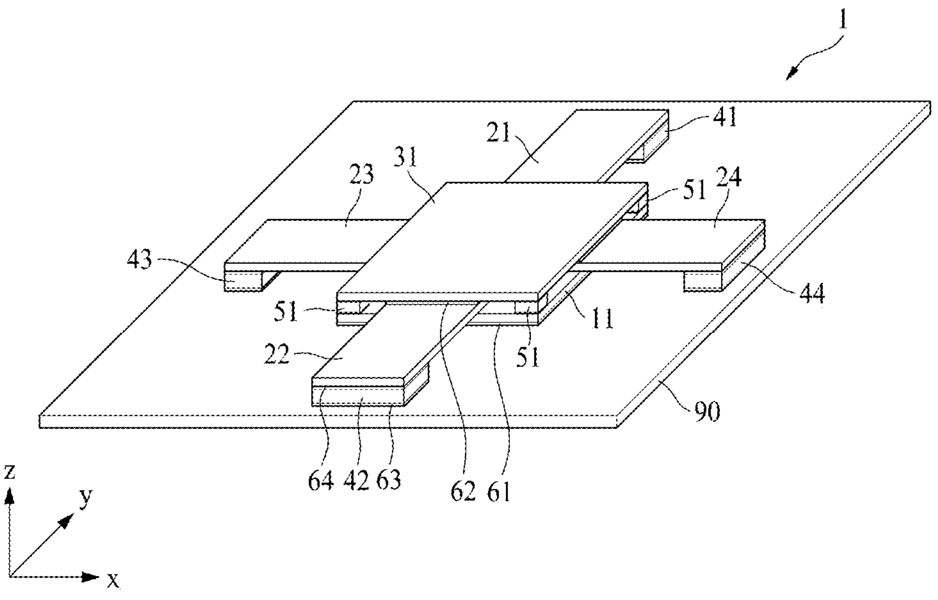
FIG. 2 is a perspective view illustrating a configuration of a sound apparatus according to a first aspect of the present disclosure.
Figure 3:
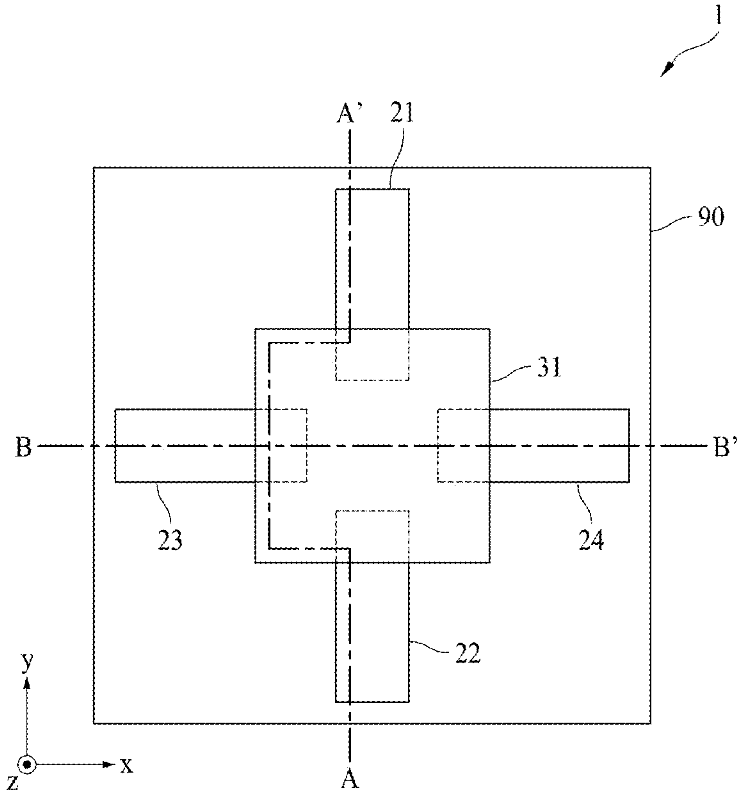
FIG. 3 is a plan view illustrating a configuration of a sound apparatus according to a first aspect of the present disclosure.
Figure 4:
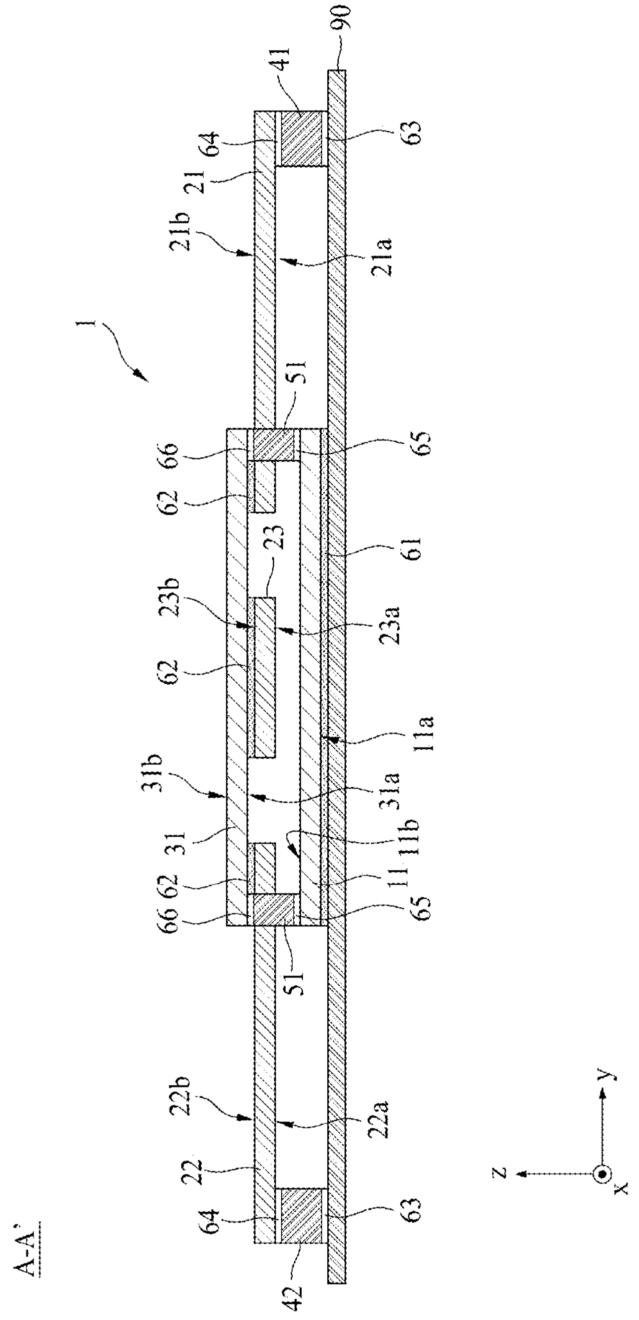
FIG. 4 is a cross-sectional view illustrating a configuration of a sound apparatus according to a first aspect of the present disclosure.
Figure 5:
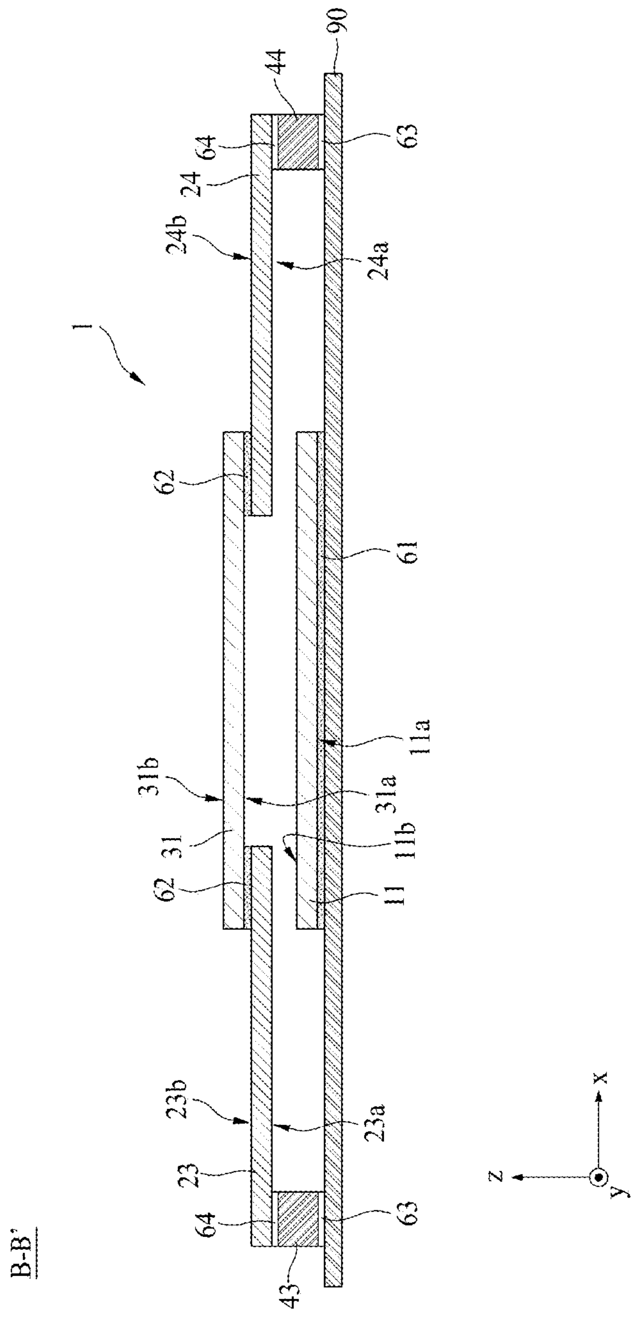
FIG. 5 is a cross-sectional view illustrating a configuration of a sound apparatus according to a first aspect of the present disclosure.
Figure 6:
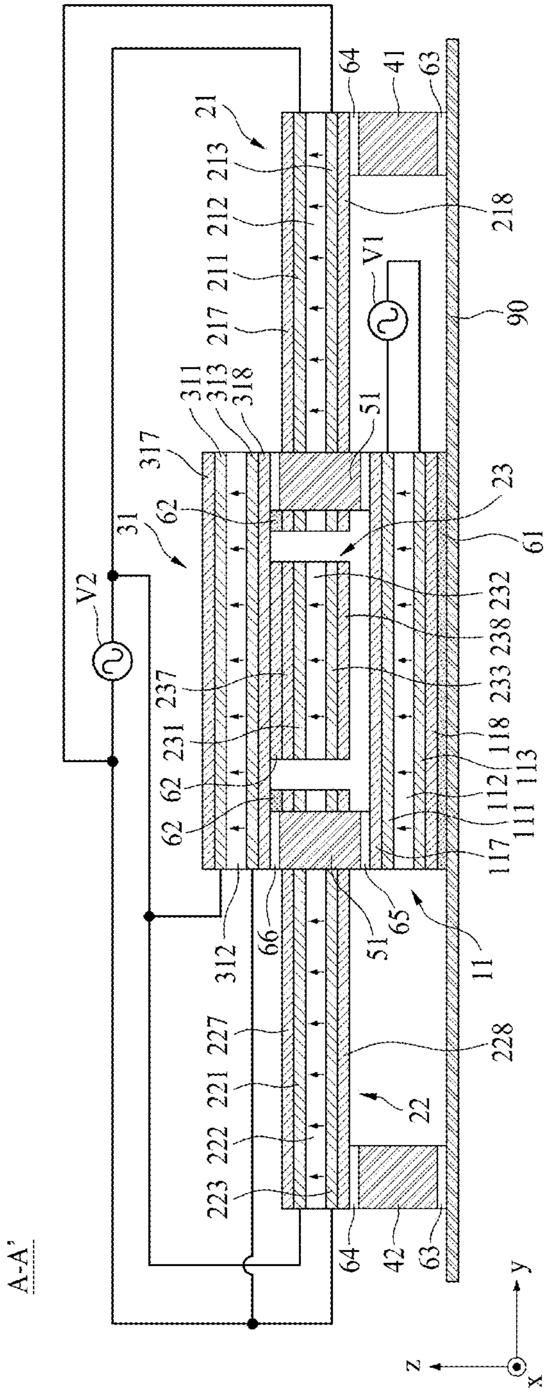
FIG. 6 is a cross-sectional view illustrating a structure of a sound apparatus according to a first aspect of the present disclosure in more detail.

FIG. 2 is a perspective view illustrating a configuration of a sound apparatus according to an aspect of the present disclosure. FIG. 3 is a plan view illustrating a configuration of a sound apparatus according to an aspect of the present disclosure. FIGS. 4 and 5 are a cross-sectional view illustrating a configuration of a sound apparatus according to an aspect of the present disclosure. FIGS. 4 and 6 illustrate a cross-sectional view taken along line A-A' of FIG. 3 according to an aspect of the present disclosure. FIG. 5 illustrates a cross-sectional view taken along line B-B' of FIG. 3 according to an aspect of the present disclosure. A detailed configuration of a sound apparatus 1 according to an aspect of the present disclosure will be described with cross-reference to FIGS. 2 to 6.

As illustrated in FIG. 2, the sound apparatus 1 may include a first vibration device 11, a plurality of second vibration devices 21 to 24, and a third vibration device 31. The sound apparatus 1 may further include a plurality of elastic members 41 to 44 and 51, and a vibration member 90.

As illustrated in FIGS. 2 and 3, the first vibration device 11 and the third vibration device 31 may have a same shape in a plane. The plurality of second vibration devices 21 to 24 may have a same shape and different sizes in a plane. In a plane, the plurality of second vibration devices 21 to 24 may have shapes and sizes which differ from those of the first vibration device 11 and the third vibration device 31. For example, the first vibration device 11 and the third vibration device 31 may have a plate shape having a rectangular shape or an approximately square shape in a plane. The plurality of second vibration devices 21 to 24 may have a plate shape having a rectangular shape including a short side and a long side in a plane.

In FIGS. 2 to 6, a coordinate-axis is illustrated where directions of short sides direction of the second vibration device 21 is the x-axis, long side direction of the second vibration device 21 is the y-axis, and a direction perpendicular to the x-axis and the y-axis is the z-axis. A direction parallel to the x-axis may be referred to as a first direction, and a direction parallel to the y-axis may be referred to as a second direction.

In an aspect of the present disclosure, the first direction and the second direction may be perpendicular to each other in a plane. The first vibration device 11, the plurality of second vibration devices 21 to 24, and the third vibration device 31 may each include two main surfaces opposite to each other. A surface of the two main surfaces of the first vibration device 11 in an opposite direction side (or negative direction side or rearward direction side) of the z-axis may be referred as a first main surface 11*a*, and a surface of the two main surfaces of the first vibration device 11 in a forward direction side (or positive direction side) of the z-axis may be referred as a second main surface 11*b*. Similarly, a surface of the two main surfaces of the plurality of second vibration devices 21 to 24 in an opposite direction side (or negative direction side or rearward direction side) of the z-axis may be referred as a first main surface 21*a*, 22*a*, 23*a*, and 24*a*, and a surface of the two main surfaces of the plurality of second vibration devices 21 to 24 in a forward direction side (or positive direction side) of the z-axis may be referred as a second main surface 21*b*, 22*b*, 23*b*, and 24*b*. Likewise, a surface of the two main surfaces of the third vibration device 31 in an opposite direction side (or negative direction side or rearward direction side) of the z-axis may be referred as a first main surface 31*a*, and a surface of the two main surfaces of the third vibration device 31 in a forward direction side (or positive direction side) of the z-axis may be referred as a second main surface 31*b*.

The first vibration device 11 may be disposed on a main surface of the vibration member 90. For example, a front surface of a first main surface 11*a* of the first vibration device 11 may be connected to or contact the vibration member 90. For example, the first vibration device 11 and the vibration member 90 may be connected to each other by an adhesive member 61 (or adhesive or adhesive layer or first adhesive member). A vibration generated from the first vibration device 11 by an input driving signal (or voice signal or sound signal) may be transferred to the vibration member 90 directly (or through (or by) the adhesive member 61). For example, the first vibration device 11 may be connected to the vibration member 90 by an entire surface attachment scheme by the adhesive member 61.

The plurality of second vibration devices 21 to 24 may be disposed on the first vibration device 11. A portion of each of the plurality of second vibration devices 21 to 24 may overlap the first vibration device 11 and the third vibration device 31 in a plane. The plurality of second vibration devices 21 to 24 may not directly contact the first vibration device 11. The plurality of second vibration devices 21 to 24 may be disposed to be rotation-symmetric with respect to an axis (or the z-axis) perpendicular to a first main surface 31*a* and a second main surface 31*b* of the third vibration device 31 in a plane. In detail, four second vibration devices 21 to

24 may have four symmetries with respect to the z-axis. For example, in a plane, the second vibration device 24 may extend in a direction rotated by 90 degrees in a clockwise direction from a long-side direction of the second vibration device 21. Likewise, in a plane, the second vibration device 22 may extend in a direction rotated by 90 degrees in a clockwise direction from a long-side direction of the second vibration device 24, and the second vibration device 23 may extend in a direction rotated by 90 degrees in a clockwise direction from a long-side direction of the second vibration device 22. Moreover, in a plane, the second vibration device 21 may extend in a direction rotated by 90 degrees in a clockwise direction from a long-side direction of the second vibration device 23. The plurality of second vibration devices 21 to 24 may be disposed not to contact each other.

A portion of a first main surface 21*a* of the second vibration device 21 may be connected to a portion of a main surface of the vibration member 90 through (or by) an elastic member 41 (or a first elastic member). Likewise, a portion (or a first end portion) of each of first main surfaces 22*a*, 23*a*, and 24*a* of the second vibration devices 22, 23, and 24 may be connected to a portion of the main surface of the vibration member 90 by elastic members 42, 43, and 44 (or first elastic members). For example, end portions (or short side portions) of the plurality of second vibration devices 21 to 24 adjacent to a center of the first vibration device 11 may be spaced apart from one another in different directions from the center of the first vibration device 11 within a range overlapping the first vibration device 11. Heights of the elastic members 41 to 44 in a z-axis direction may be equal to one another in a cross-sectional view. Therefore, the plurality of second vibration devices 21 to 24 may be disposed at a same position (or height) in the z-axis direction. Accordingly, the plurality of second vibration devices 21 to 24 may not overlap each other in a plane. Vibrations generated from the plurality of second vibration devices 21 to 24 by an input driving signal (or voice signal or sound signal) may be respectively transferred to the vibration member 90 through (or by) the elastic members 41 to 44.

Moreover, the elastic members 41 to 44 according to an aspect of the present disclosure may be provided at end portions (or second end portions), which are opposite to a portion, of the plurality of second vibration devices 21 to 24 connected to (or contact) the third vibration device 31 in a cross-sectional view. However, the elastic members 41 to 44 according to an aspect of the present disclosure may not need to be disposed at positions illustrated in an aspect of the present disclosure. For example, the elastic members 41 to 44 may be disposed at center portions (for example, each of the first main surfaces 21*a* to 24*a*), which do not overlap partial portions of second main surfaces 21*b* to 24*b*, of the plurality of second vibration devices 21 to 24 connected to (or contact) the third vibration device 31 in a plane.

The third vibration device 31 may be disposed on the first vibration device 11. In detail, a first main surface 31*a* of the third vibration device 31 may be disposed to be spaced apart from and opposite with respect to the second main surface 11*b* of the first vibration device 11 by a certain (or a pre-defined) distance. For example, the third vibration device 31 may not directly contact the first vibration device 11. The third vibration device 31 may be connected to a corner portion of the second main surface 11*b*, having a rectangular shape, of the first vibration device 11 through (or by) four elastic members 51 (or second elastic members) disposed at a corner portion (or a first portion) of the first main surface 31*a* having a rectangular shape. A height of the four elastic members 51 in the z-axis direction may correspond to a certain (or a pre-defined) distance between the first main surface 31*a* of the third vibration device 31 and the second main surface 11*b* of the first vibration device 11. A shape of the third vibration device 31 may be substantially a same as that of the first vibration device 11. For example, the four elastic members 51 may be four second elastic members, four connection members, or four coupling members.

A portion (or a second portion) of the first main surface 31*a* of the third vibration device 31 may be connected to a portion of each of the second main surfaces 21*b* to 24*b* of the plurality of second vibration devices 21 to 24 through (or by) the adhesive member 62 (or adhesive or adhesive layer or second adhesive member). The plurality of second vibration devices 21 to 24 may extend radially from the third vibration device 31 in a plane. For example, an angle between the plurality of second vibration devices 21 to 24 may be 90 degrees. In detail, a long-side direction of the second vibration devices 21 and 22 may be disposed to be parallel to a second direction (or a y-axis direction). Short sides of the second vibration device 21 and the second vibration device 22 may be disposed to face each other with a certain space between the first vibration device 11 and the third vibration device 31 therebetween in a plane. A long-side direction of the second vibration devices 23 and 24 may be disposed to be parallel to a first direction (or an x-axis direction). Short sides of the second vibration device 23 and the second vibration device 24 may be disposed to face each other with a certain space between the first vibration device 11 and the third vibration device 31 therebetween in a plane. A vibration generated from the third vibration device 31 by an input driving signal (or voice signal or sound signal) may be transferred to the vibration member 90 through (or by) the elastic member 51, the first vibration device 11, the plurality of second vibration devices 21 to 24, and the elastic members 41 to 44.

As illustrated in FIGS. 2 to 5, a portion, which is not connected to (or contact) the third vibration device 31, of the second main surfaces 21*b* to 24*b* of each of the plurality of second vibration devices 21 to 24 may not overlap the third vibration device 31 in a plane. Moreover, in an aspect of the present disclosure, the first vibration device 11 and the third vibration device 31 may have a same shape, and a front surface of the second main surface 11*b* of the first vibration device 11 may be covered by the third vibration device 31 in a plane. For example, the first vibration device 11 may overlap the third vibration device 31 in a plane. Accordingly, a portion, which is connected to (or contact) the third vibration device 31, of the second main surfaces 21*b* to 24*b* of each of the plurality of second vibration devices 21 to 24 may overlap the first vibration device 11 in a plane.

The elastic members 41 to 44 may each be connected to the plurality of second vibration devices 21 to 24 and the vibration member 90 through (or by) adhesive members 63 and 64 (or adhesive or adhesive layer). The elastic member 51 may be connected to the first vibration device 11 and the third vibration device 31 through (or by) adhesive members 65 and 66 (or adhesive or adhesive layer). For example, the elastic members 41 to 44 may each be connected to the vibration member 90 through (or by) an adhesive member 63 (or a third adhesive member). For example, the elastic members 41 to 44 may each be connected to the plurality of second vibration devices 21 to 24 through (or by) an adhesive member 64 (or a fourth adhesive member). For example, the elastic member 51 may each be connected to the first vibration device 11 through (or by) an adhesive member 65 (or a fifth adhesive member). For example, the elastic member 51 may be connected to the third vibration device 31 through (or by) an adhesive member 66 (or a sixth adhesive member). The elastic members 41 to 44 and 51 may be configured by, for example, a material such as resin or the like. An example of resin that may be configured as the elastic members 41 to 44 and 51 may be used polyurethane or polyethylene terephthalate (PET), but aspects of the present disclosure are not limited thereto. At least a portion of the elastic members 41 to 44 and 51 may have a hexahedral shape, but aspects of the present disclosure are not limited thereto. For example, the elastic members 41 to 44 and 51 may have a rectangular shape in a plane and a cross-sectional view. Moreover, at least a portion of the elastic members 41 to 44 and 51 may have a circular pillar (or cylindrical) shape or an oval pillar (or elliptic cylinder) shape. For example, the elastic members 41 to 44 and 51 may be circular or oval (or ellipse) in a plane, or may have a rectangular shape in a cross-sectional view. The elastic members 41 to 44 may be a transfer member or a vibration transfer member which transfers a vibration, generated by the plurality of second vibration devices 21 to 24, to the vibration member 90, based on a driving signal input thereto. Furthermore, the elastic member 51 may be a transfer member or a vibration transfer member which transfers a vibration, generated by the third vibration device 31, to the vibration member 90 through (or by) the first vibration device 11, based on a driving signal input thereto.

The vibration member 90 may be a passive vibration plate, a vibration plate, or a vibration substrate. The vibration member 90 may have a flat plate shape (or a plate shape), but aspects of the present disclosure are not limited thereto. The vibration member 90 may be configured in a material such as metal, resin, glass, hard paper, wood, rubber, plastic, fiber, cloth, paper, leather, carbon, or the like, but aspects of the present disclosure are not limited thereto. For example, an example of the metal that may be configured in the vibration member 90 may include stainless steel, but aspects of the present disclosure are not limited thereto. For example, the vibration member 90 may be configured in styrene material. Further, the vibration member 90 may include a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular glass window (or a vehicular window), a vehicular exterior material, a vehicular seat interior material, a vehicular ceiling material, a building ceiling material, a building interior material, a building glass window, an aircraft interior material, an aircraft glass window, or a mirror, but aspects of the present disclosure are not limited thereto.

According to another aspect of the present disclosure, one or more of the adhesive members 61 to 66 may include an elasticity material which has adhesiveness and is capable of compression and decompression. For example, the adhesive members 61 to 66 may include an adhesive material having elasticity or flexibility. For example, the adhesive members 61 to 66 may include an adhesive material which is low in elastic modulus (or Young's modulus). For example, the adhesive members 61 to 66 may be configured in an adhesive resin, an adhesive, an adhesive tape, or an adhesive pad, or the like, but aspects of the present disclosure are not limited thereto. For example, the adhesive tape may include a double-sided tape, a double-sided foam tape, a double-sided sponge tape, which have adhesive layers, or the like, but aspects of the present disclosure are not limited thereto. The adhesive pad may have an adhesive layer and may an elastic pad such as a silicone pad or a rubber pad capable of compression and decompression.

The adhesive resin, the adhesive, or the adhesive layer of each of the adhesive members 61 to 66 according to another aspect of the present disclosure may include epoxy-based, acryl-based, silicone-based, or urethane-based. For example, the adhesive members 61 to 66 may include an acrylic-based material which is relatively better in adhesive force and hardness than the urethane so that the vibration of the vibration device may be transferred to the vibration member 90 well, but aspects of the present disclosure are not limited thereto.

The adhesive resin, the adhesive, or the adhesive layer of each of the adhesive members 61 to 66 according to an aspect of the present disclosure may be a photo-curable adhesive material, but aspects of the present disclosure are not limited thereto. For example, the adhesive resin, the adhesive, or the adhesive layer may be an ultraviolet (UV) adhesive, but aspects of the present disclosure are not limited thereto.

The aspect of the structure of the sound apparatus 1 will be described in more detail with reference to FIG. 6. FIG. 6 is an enlarged view of illustrating the first vibration device 11, the second vibration devices 21, 22, and 23, and the third vibration device 31 at a same section as that of FIG. 4. Moreover, in FIG. 6, a connection relationship of each electrode included in the first vibration device 11, the second vibration devices 21, 22, and 23, and the third vibration device 31 schematically illustrates by a circuit diagram to describe a method for inputting a driving signal to the sound apparatus 1.

The first vibration device 11 may include an electrode (or a first electrode) 111, a vibration layer (or a piezoelectric layer) 112, and an electrode (or a second electrode) 113. The electrode 111 and the electrode 113 may be arranged with (or disposed) the vibration layer 112 therebetween in a thickness direction. A voltage V1 may be applied to the vibration layer 112 through (or by) the electrode 111 and the electrode 113. The voltage V1 may correspond to a driving signal (or a voice signal or a sound signal).

The first vibration device 11 may further include a protection layer (or a first protection member) 117. The protection layer 117 may be configured to protect and/or insulate an upper surface of the electrode 111. The first vibration device 11 may further include a second protection layer (or a second protection member) 118. The second protection layer 118 may be configured to protect and/or insulate a lower surface of the electrode 113. For example, one or more of the protection layer 117 and the second protection layer 118 may be omitted.

In an aspect of the present disclosure, a poling direction (or a polarization direction) of the vibration layer 112 may be a forward direction (or a positive direction) or an opposite direction (or a negative direction) of the z-axis, as illustrated in FIG. 6. In addition, wires (or lines) configured to apply a voltage to each electrode may be connected to the electrodes 111 and 113 by soldering or the like.

The first vibration device 11 may be connected to the vibration member 90 by an adhesive member 61 (or a first adhesive member). The adhesive member 61 may be configured to connect the first vibration device 11 to the vibration member 90.

The second vibration device 23 may include an electrode (or a first electrode) 231, a vibration layer (or a piezoelectric layer) 232, and an electrode (or a second electrode) 233. The electrode 231 and the electrode 233 may be arranged with (or disposed) the vibration layer 232 therebetween in a thickness direction. A voltage V2 may be applied to the vibration layer 232 through a signal line, the electrode 231 and the electrode 233. The voltage V2 may correspond to a driving signal (or a voice signal or a sound signal) and may have an opposite phase to the voltage V1 applied to the first vibration device 11. For example, the driving signal applied to the second vibration device 23 may have a phase which is opposite to a phase of the driving signal applied to the first vibration device 11.

The second vibration device 23 may further include a protection layer (or a first protection member) 237. The protection layer 237 may be configured to protect and/or insulate an upper surface of the electrode 231. The second vibration device 23 may further include a second protection layer (or a second protection member) 238. The second protection layer 238 may be configured to protect and/or insulate a lower surface of the electrode 233. For example, one or more of the protection layer 237 and the second protection layer 238 may be omitted.

The second vibration device 23 may be connected to the third vibration device 31 by an adhesive member 62. The adhesive member 62 may be configured to connect a portion of the second vibration device 23 to the first main surface 31*a* of the third vibration device 31. In an aspect of the present disclosure, a poling direction of the vibration layer 232 may be a forward direction (or a positive direction) or an opposite direction (or a negative direction) of the z-axis, as illustrated in FIG. 6. Wires (or lines) configured to apply a voltage to each electrode may be connected to the electrodes 231 and 233 by soldering or the like.

The second vibration devices 21, 22, and 24 may have a same configuration as that of the second vibration device 23. For example, the second vibration device 21 may include a first electrode 211, a vibration layer 212, a second electrode 213, a first protection member 217, and a second protection member 218. The first electrode and the second electrode may be arranged with (or disposed) the vibration layer therebetween in a thickness direction. A voltage V2 may be applied to the vibration layer through a signal line, the first electrode, and the second electrode. For example, the driving signal input to the second vibration devices 21, 22, and 24 may have a phase which is opposite to that of the driving signal input to the first vibration device 11. As illustrated in FIG. 6, a portion of the second vibration device 21 may be connected to the first main surface 31*a* of the third vibration device 31 by the adhesive member 62. Moreover, the second vibration device 22 may include a first electrode 221, a vibration layer 222, a second electrode 223, a first protection member 227, and a second protection member 228. The first electrode and the second electrode may be arranged with (or disposed) the vibration layer therebetween in a thickness direction. A voltage V2 may be applied to the vibration layer through a signal line, the first electrode, and the second electrode. As illustrated in FIGS. 2 and 6, a portion of the second vibration device 22 may be connected to the first main surface 31*a* of the third vibration device 31 by the adhesive member 62. Moreover, the second vibration device 24 may include a first electrode 241, a vibration layer 242, a second electrode 243, a first protection member, and a second protection member. The first electrode and the second electrode may be arranged with (or disposed) the vibration layer therebetween in a thickness direction. A voltage V2 may be applied to the vibration layer through a signal line, the first electrode and the second electrode. A portion of the second vibration device 24 may be connected to the first main surface 31*a* of the third vibration device 31 by the adhesive member 62.

The third vibration device 31 may include an electrode (or a first electrode) 311, a vibration layer (or a piezoelectric layer) 312, an electrode (or a second electrode) 313, a protection layer (or a first protection member) 317, and a protection layer (or a second protection member) 318. The electrode 311 and the electrode 313 may be arranged with (or disposed) the vibration layer 312 therebetween in a thickness direction. A voltage V2 may be applied to the vibration layer 312 through the electrode 311 and the electrode 313. The voltage V2 may correspond to a driving signal (or a voice signal or a sound signal) which is applied to the plurality of second vibration devices 21 to 24 and the third vibration device 31 in common. For example, the driving signal applied to the third vibration device 31 may have a same phase as a phase of the driving signal applied to the plurality of second vibration devices 21 to 24, and may have a phase which is opposite to the phase of the driving signal applied to the first vibration device 11. The protection layer 317 may be configured to protect and/or insulate an upper surface of the electrode 311. The second protection layer 318 may be configured to protect and/or insulate a lower surface of the electrode 313. One or more of the protection layer 317 and the second protection layer 318 may be omitted. In an aspect of the present disclosure, a poling direction of the vibration layer 312 may be a forward direction (or a positive direction) or an opposite direction (or a negative direction) of the z-axis, as illustrated in FIG. 6. Wires (or lines) configured to apply a voltage to each electrode may be connected to the electrodes 311 and 313 by soldering or the like.

A voltage applied to each of the first vibration device 11, the plurality of second vibration devices 21 to 24, and the third vibration device 31 may be based on a voice signal, and thus, may be an alternating current (AC) voltage based on a frequency of a voice which should be generated. In FIG. 6, an AC voltage supplied to the first vibration device 11 may be V1, and an AC voltage supplied to the plurality of second vibration devices 21 to 24 and the third vibration device 31 may be V2. One terminal of an AC power source may be connected to (or contact) the electrode 111, the electrode 211, the electrode 221, the electrode 231, the electrode 241, and the electrode 311, and the other terminal of the AC power source may be connected to (or contact) the electrode 113, the electrode 213, the electrode 223, the electrode 233, the electrode 243, and the electrode 313. Moreover, in FIG. 6, two AC power sources are illustrated, but one AC power source may be used. For example, a driving signal may be supplied from one (common) AC power source to the first vibration device 11, and a signal obtained by inverting a phase of a corresponding driving signal may be supplied as a common driving signal to the plurality of second vibration devices 21 to 24 and the third vibration device 31. For example, one terminal of a common AC power source may be connected to (or contact) the electrode 111, the electrode 213, the electrode 223, the electrode 233, the electrode 243, and the electrode 313, and the other terminal of the common AC power source may be connected to (or contact) the electrode 113, the electrode 211, the electrode 221, the electrode 231, the electrode 241, and the electrode 311.

When an AC voltage is applied between the electrode 111 and the electrode 113 of the first vibration device 11, the vibration layer 112 may contract and expand, and a periodic stress may be applied to the vibration member 90. For example, the first vibration device 11 may transfer a periodic stress to the vibration member 90, and the vibration member 90 may flexurally vibrate based on the transferred stress. A vibration (for example, a sound) based on a voice signal may be generated by a vibration of the vibration member 90 based on the transferred stress. Likewise, when an AC voltage is applied between the electrodes 211, 221, 231, and 241 and the electrodes 213, 223, 233, and 243 of the plurality of second vibration devices 21 to 24, the vibration layers 212, 222, 232, and 242 may contract and expand, and a periodic stress may be applied to the vibration member 90 through (or by) the elastic members 41 to 44. Moreover, when an AC voltage is applied between the electrode 311 and the electrode 312 of the third vibration device 31, the vibration layer 312 may contract and expand, and a periodic stress may be applied to the vibration member 90 through (or by) the elastic member 51 and the first vibration device 11. The vibration member 90 may flexurally vibrate based on the transferred stress, and a vibration and/or a sound based on a voice signal may be generated.

Material of each of the vibration layer 112, 212, 222, 232, 242, and 312 is not particularly limited thereto, but may include ferroelectric ceramic, having good piezoelectric properties, such as lead zirconate titanate (PZT)-based materials or the like to increase the amount of displacement. As another example, material used as material of each of the vibration layer 112, 212, 222, 232, 242, and 312 may include a piezoelectric material of a ceramic-based material capable of implementing a relatively strong vibration. As another example, each of the vibration layer 112, 212, 222, 232, 242, and 312 may include a piezoelectric ceramic material having a perovskite-based crystal structure. Moreover, each of the vibration layer 112, 212, 222, 232, 242, and 312 may have a polycrystalline structure or a single-crystalline structure. For example, each of the vibration layer 112, 212, 222, 232, 242, and 312 may be configured as the polycrystalline ceramic or the single-crystalline ceramic. Furthermore, each of the vibration layer 112, 212, 222, 232, 242, and 312 may be configured as a PVDF (Polyvinylidene fluoride)-based material or material including a piezoelectric material including lead (Pb), or may be configured as a piezoelectric material without lead (Pb). For example, the piezoelectric material including lead (Pb) may include one or more of a lead zirconate titanate (PZT)-based material, a lead zirconate nickel niobate (PZNN)-based material, a lead magnesium niobate (PMN)-based material, a lead nickel niobate (PNN)-based material, a lead zirconate niobate (PZN)-based material, or a lead indium niobate (PIN)-based material, but aspects of the present disclosure are not limited thereto. For example, the piezoelectric material without lead (Pb) may include one or more of barium titanate ($BaTiO_3$), calcium titanate ($CaTiO_3$), and strontium titanate ($SrTiO_3$), but aspects of the present disclosure are not limited thereto.

The adhesive layers 61, 62, 63, 64, 65 and 66 may be configured as a compressed resin material, an adhesive, or an adhesive tape or the like, but aspects of the present disclosure are not limited thereto. Moreover, an elastic modulus of the adhesive member 61 may be equal to or different from an elastic modulus of the adhesive member 62. For example, the adhesive member 61 may have an elastic modulus which is smaller than that of the adhesive member 62. Further, a lateral surface of each of the first vibration device 11, the plurality of second vibration devices 21 to 24, and the third vibration device 31 may be covered by an insulator such as resin or the like to prevent an electrical short circuit between the vibration devices and the other members.

Material of the first electrode 111, 211, 221, 231, 241, and 311 and the second electrode 113, 213, 223, 233, 243, and 313 of each of the first vibration device 11, the plurality of second vibration devices 21 to 24, and the third vibration device 31 may include a transparent conductive material, a semitransparent conductive material, or an opaque conductive material. For example, as the transparent or semitransparent conductive material, the first electrode and the second electrode may include one or more of indium tin oxide (ITO) or indium zinc oxide (IZO), but aspects of the present disclosure are not limited thereto. As the opaque conductive material, the first electrode and the second electrode may include one of an aluminum (Al), a copper (Cu), a gold (Au), a silver (Ag), a molybdenum (Mo), and a magnesium (Mg), or an alloy thereof, but aspects of the present disclosure are not limited thereto. For example, the protection layer 117, 118, 227, 228, 237, 238, 317, and 318 may be a polyimide (PI) film, a polyethylene terephthalate (PET) film, or polyethylene naphthalate (PEN) film, but aspects of the present disclosure are not limited thereto.

Figure 7:
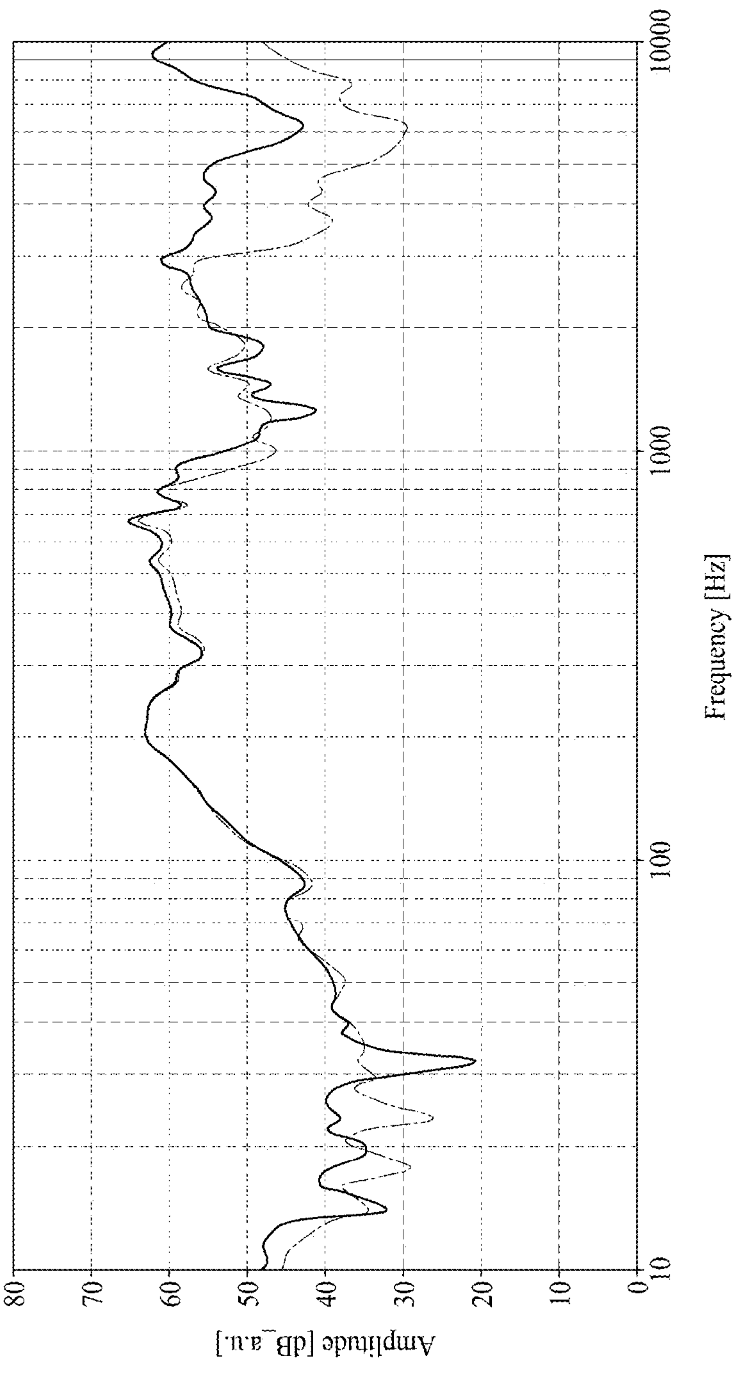
FIG. 7 is a graph illustrating a sound characteristic of the sound apparatus according to a first aspect of the present disclosure.

The enhancement of sound quality of the sound apparatus 1 according to an aspect of the present disclosure may be described with reference to real measurement data. FIG. 7 is a graph illustrating a sound characteristic of the sound apparatus according to an aspect of the present disclosure. In FIG. 7, the abscissa-axis represents a frequency (Hz) based on a log scale, and the ordinate-axis represents an amplitude (or a sound pressure level) based on a decibel (dB) unit. In FIG. 7, a curve illustrated by a solid line represents a sound characteristic of the sound apparatus 1 according to an aspect of the present disclosure when a phase of each driving signal (or voice signal or sound signal) applied to the plurality of second vibration devices 21 to 24 and the third vibration device 31 is opposite to that of a driving signal applied to the first vibration device 11. In FIG. 7, a curve illustrated by a dash-single dotted line represents a sound characteristic of a sound apparatus (hereinafter referred to as an experimental example) when phases of driving signals (or voice signal or sound signal) applied to the first vibration device 11, the plurality of second vibration devices 21 to 24, and the third vibration device 31 are equal to one another. The experimental example may have a same structure as that of the sound apparatus 1 according to an aspect of the present disclosure illustrated in FIGS. 2 to 6.

In FIG. 7, comparing with a curve of less than 3 kHz, it may be seen that frequency characteristics are approximately similar to one another. On the other hand, comparing with a curve of about 3 kHz to about 10 kHz, it may be seen that an amplitude is largely reduced in a configuration according to the experimental example. It may be seen that an amplitude is not largely reduced in about 3 kHz in a configuration according to an aspect of the present disclosure, and an amplitude is high in a full frequency band of 3 kHz to 10 kHz compared to the configuration according to the experimental example. For example, comparing with the experimental example, the sound apparatus 1 according to an aspect of the present disclosure may provide a relatively flat frequency characteristic in a wide frequency band up to a high-pitched sound band from a low-pitched sound band. Accordingly, the sound apparatus 1 according to an aspect of the present disclosure may be enhanced in flatness characteristic of a sound pressure level and may be enhanced in sound quality.

Second Aspect

In the following description, the sound apparatus 1 according to the second aspect of the present disclosure will be described. A configuration of a first vibration device 11, a second vibration device 21 and 22, a third vibration device 31, elastic members 41, 42, and 51, and a vibration member 90 are substantially a same as the first aspect of the present disclosure, and thus, its descriptions may be omitted.

Figure 8:
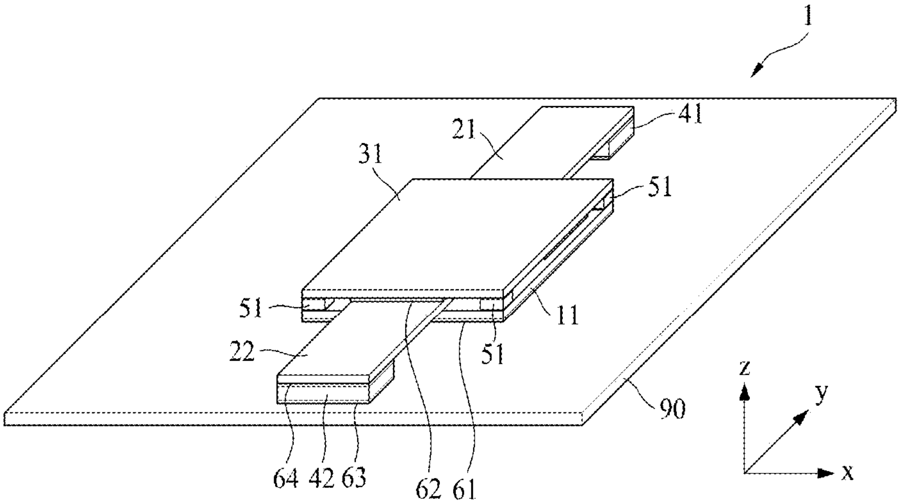
FIG. 8 is a perspective view illustrating a configuration of a sound apparatus according to a second aspect of the present disclosure.
Figure 9:
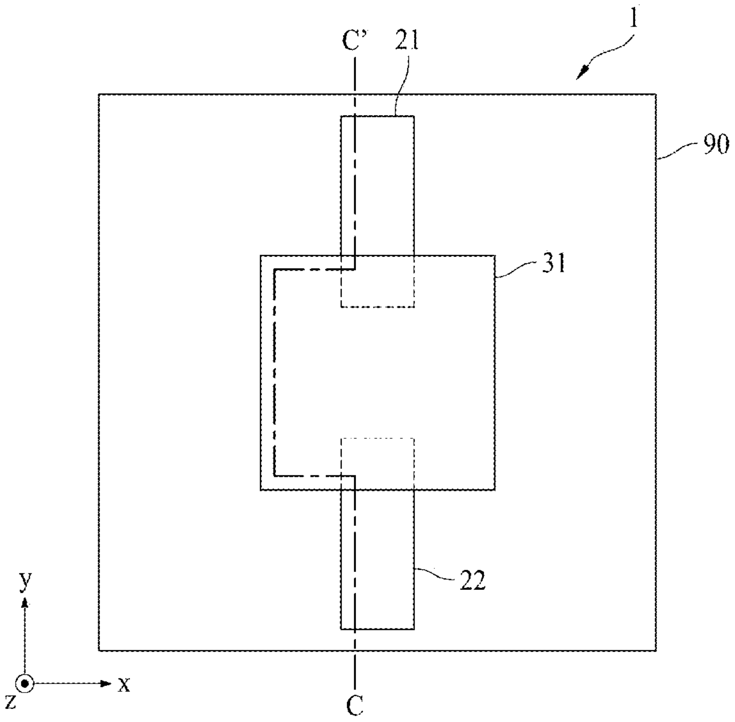
FIG. 9 is a plan view illustrating a configuration of a sound apparatus according to a second aspect of the present disclosure.
Figure 10:
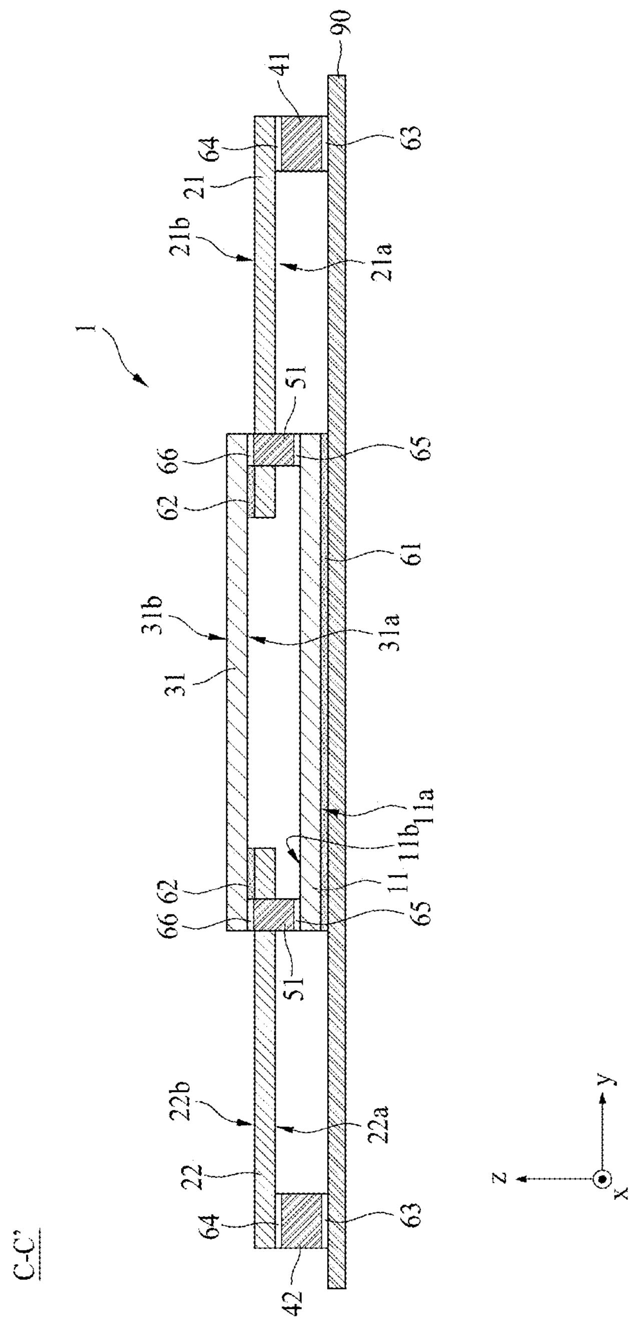
FIG. 10 is a cross-sectional view illustrating a configuration of a sound apparatus according to a second aspect of the present disclosure.
Figure 11:
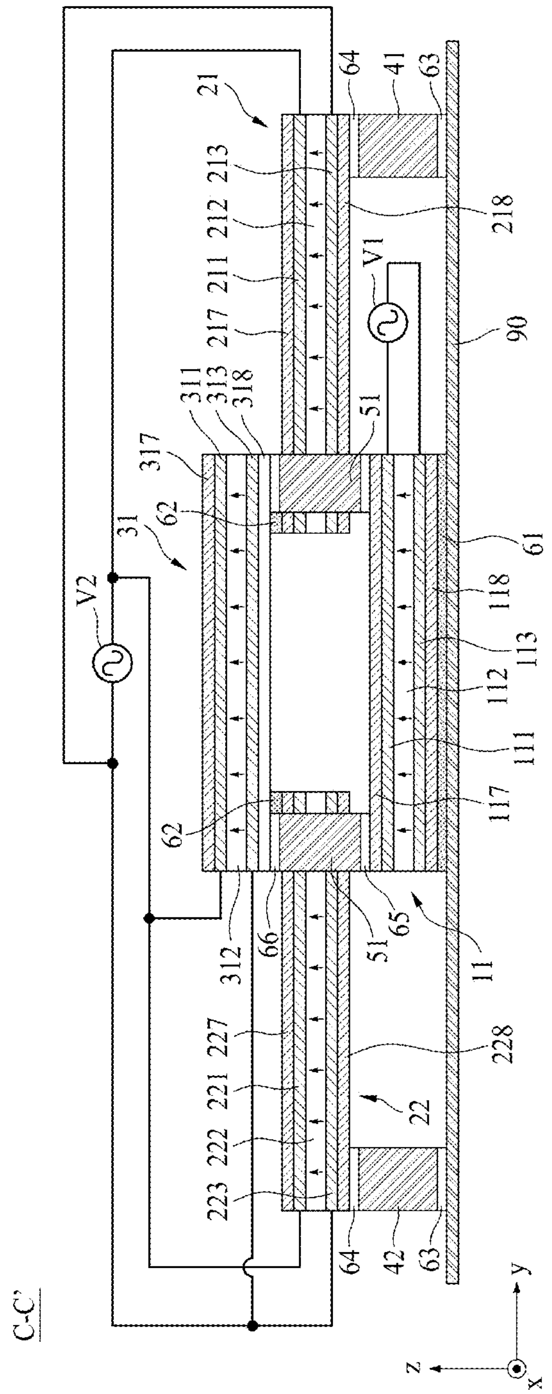
FIG. 11 is a cross-sectional view illustrating a structure of a sound apparatus according to a second aspect of the present disclosure in more detail.

FIG. 8 is a perspective view illustrating a configuration of a sound apparatus 1 according to a second aspect of the present disclosure. FIG. 9 is a plan view illustrating a configuration of a sound apparatus according to a second aspect of the present disclosure. FIG. 10 is a cross-sectional view illustrating a configuration of a sound apparatus according to a second aspect of the present disclosure. FIG. 11 is a cross-sectional view illustrating a structure of a sound apparatus according to a second aspect of the present disclosure in more detail. FIGS. 10 and 11 are a cross-sectional view taken along line C-C' illustrated in FIG. 9 according to an aspect of the present disclosure. A detailed configuration of the sound apparatus 1 according to the second aspect of the present disclosure will be described with cross-reference to FIGS. 8 to 11.

As illustrated in FIG. 8, a sound apparatus 1 according to a second aspect of the present disclosure may differ from the sound apparatus 1 according to a first aspect of the present disclosure in that the sound apparatus 1 according to the second aspect does not include second vibration devices 23 and 24 and elastic members 43 and 44. For example, the sound apparatus 1 according to the second aspect of the present disclosure includes a first vibration device 11, a second vibration devices 21 and 22, a third vibration device 31, an elastic members 41, 42, and 51, and a vibration member 90.

The second vibration devices 21 and 22 may be disposed at an upper portion of the first vibration device 11. A portion of the second vibration devices 21 and 22 may overlap the first vibration device 11 and the third vibration device 31 in a plane. The second vibration devices 21 and 22 may not directly contact the first vibration device 11. The second vibration devices 21 and 22 may be disposed to be rotation-symmetric with respect to a z-axis in a plane. In detail, two second vibration devices 21 and 22 may have two symmetries with respect to the z-axis. The second vibration devices 21 and 22 may be disposed not to contact each other. A portion of a first main surface 21*a* of the second vibration device 21 may be connected to a portion of a main surface of the vibration member 90 through (or by) an elastic member 41 (or a first elastic member). Likewise, a portion of a first main surface 22*a* of the second vibration device 22 may be connected to a portion of a main surface of the vibration member 90 through (or by) an elastic member 42. Heights of the elastic members 41 and 42 in a z-axis direction may be equal to one another in a cross-sectional view. Therefore, the second vibration devices 21 and 22 may be disposed at a same position (or height) in the z-axis direction. Accordingly, the second vibration devices 21 and 22 may not overlap each other in a plane. Vibrations generated from the second vibration devices 21 and 22 by an input driving signal (or voice signal or sound signal) may be respectively transferred to the vibration member 90 through (or by) the elastic members 41 and 42.

The first vibration device 11 may be connected to the vibration member 90 by an adhesive member 61 (or a first adhesive member). A portion of a second main surface 21*b* of the second vibration device 21 may be connected to a first main surface 31*a* of the third vibration device 31 by an adhesive member 62. A portion of a second main surface 22*b* of the second vibration device 22 may be connected to the first main surface 31*a* of the third vibration device 31 by an adhesive member 62. A corner portion of the first main surface 31*a* of the third vibration device 31 may be connected to a corner portion of a second main surface 11*b* of the first vibration device 11 through (or by) four elastic members 51. The elastic members 41 and 42 may be connected to each of the second vibration devices 21 and 22 and the vibration member 90 through (or by) adhesive members 63 and 64 (or adhesive or adhesive layer). For example, the elastic members 41 and 42 may be connected to the vibration member 90 through (or by) an adhesive member 63 (or a third adhesive member). For example, the elastic members 41 and 42 may be connected to each of the second vibration devices 21 and 22 through (or by) an adhesive member 64 (or a fourth adhesive member). For example, the elastic member 51 may be connected to the first vibration device 11 through (or by) an adhesive member 65 (or a fifth adhesive member). For example, the elastic member 51 may be connected to the third vibration device 31 through (or by) an adhesive member 66 (or a sixth adhesive member).

The aspect of the structure of the sound apparatus 1 will be described in more detail with reference to FIG. 11. FIG. 11 is an enlarged view of illustrating the first vibration device 11, the second vibration devices 21 and 22, and the third vibration device 31 at a same section as that of FIG. 10. Moreover, in FIG. 11, a connection relationship of each electrode included in the first vibration device 11, the second vibration devices 21 and 22, and the third vibration device 31 schematically illustrates by a circuit diagram to describe a method for inputting a driving signal to the sound apparatus 1.

A voltage V1 may be applied to the vibration layer 112 of the first vibration device 11 through the electrode 111 and the electrode 113. The voltage V1 may correspond to a driving signal (or a voice signal or a sound signal). The second vibration device 21 and the second vibration device 22 may have substantially a same structure as that of the second vibration device 23 according to a first aspect of the present disclosure illustrated in FIG. 6. For example, the second vibration device 21 may include an electrode (or a first electrode) 211, a vibration layer (or a piezoelectric layer) 212, an electrode (or a second electrode) 213, a protection layer (or a first protection member) 217, and a second protection layer (or a second protection member) 218. The electrode 211 and the electrode 213 may be arranged with (or disposed) the vibration layer 212 therebetween in a thickness direction. A voltage V2 may be applied to the vibration layer 212 through a signal line, the electrode 211, and the electrode 213. Likewise, the second vibration device 22 may include an electrode (or a first electrode) 221, a vibration layer (or a piezoelectric layer) 222, an electrode (or a second electrode) 223, a protection layer (or a first protection member) 227, and a second protection layer (or a second protection member) 228. The electrode 221 and the electrode 223 may be arranged with (or disposed) the vibration layer 222 therebetween in a thickness direction. A voltage V2 may be applied to the vibration layer 222 through a signal line, the electrode 221, and the electrode 223. The voltage V2 may have a phase which is opposite to the voltage V1 applied to the first vibration device 11 corresponding to a driving signal (or a voice signal or a sound signal). A voltage V2 may be applied to the vibration layer 312 of the third vibration device 31 through the electrode 311 and the electrode 312. The voltage V2 may correspond to a driving signal (or a voice signal or a sound signal) which is commonly applied to the third vibration device 31 and the second vibration devices 21 and 22. For example, the voltage V2 applied to the third vibration device 31 may have a phase which is opposite to a phase of the voltage V2 applied to the first vibration device 11.

A voltage applied to each of the first vibration device 11, the second vibration device 21, the second vibration device 22, and the third vibration device 31 may be based on a voice signal, and thus, may be an alternating current (AC) voltage based on a frequency of a voice which should be generated. In FIG. 11, an AC voltage supplied to the first vibration device 11 may be V1, and an AC voltage supplied to the second vibration devices 21 and 22 and the third vibration device 31 may be V2. One terminal of an AC power source may be connected to (or contact) the electrode 111, the electrode 211, and the electrode 311, and the other terminal of the AC power source may be connected to (or contact) the electrode 113, the electrode 213, the electrode 223, and the electrode 313. Moreover, in FIG. 11, two AC power sources are illustrated, but one AC power source may be used. For example, a driving signal may be supplied from one (common) AC power source to the first vibration device 11, and a signal obtained by inverting a phase of a corresponding driving signal may be supplied as a common driving signal to the third vibration device 31 and the second vibration devices 21 and 22. For example, one terminal of a common AC power source may be connected to (or contact) the electrode 111, the electrode 213, the electrode 223, and the electrode 313, and the other terminal of the common AC power source may be connected to (or contact) the electrode 113, the electrode 211, the electrode 221, and the electrode 311.

When an AC voltage is applied between the electrode 111 and the electrode 113 of the first vibration device 11, the vibration layer 112 may contract and expand, and a periodic stress may be applied to the vibration member 90. For example, the first vibration device 11 may transfer a periodic stress to the vibration member 90, and the vibration member 90 may flexurally vibrate based on the transferred stress. A vibration (for example, a sound) based on a voice signal may be generated by a vibration of the vibration member 90 based on the transferred stress. Likewise, when an AC voltage is applied between the electrodes 211 and 221 and the electrodes 213 and 223 of the second vibration devices 21 and 22, the vibration layers 212 and 222 may contract and expand, and a periodic stress may be applied to the vibration member 90 through (or by) the elastic members 41 and 42. Moreover, when an AC voltage is applied between the electrode 311 and the electrode 312 of the third vibration device 31, the vibration layer 312 may contract and expand, and a periodic stress may be applied to the vibration member 90 through (or by) the elastic member 51 and the first vibration device 11. The vibration member 90 may flexurally vibrate based on the transferred stress, and a vibration and/or a sound based on a voice signal may be generated.

In an aspect of the present disclosure, two second vibration devices 21 and 22 may be used at the sound apparatus 1. In the first aspect of the present disclosure, four second vibration devices 21 to 24 may be used at the sound apparatus 1. However, the number of second vibration devices disposed at the sound apparatus 1 according to another aspect of the present disclosure is not limited to two or four. In detail, the second vibration devices may be disposed to be rotation-symmetric with respect to a z-axis in a plane. For example, the sound apparatus 1 according to an aspect of the present disclosure may include six second vibration devices. For example, the second vibration device according to an aspect of the present disclosure may be disposed in the sound apparatus 1 to have six symmetries. In this case, each of the second vibration devices may be disposed to extend in a direction rotating by 60 degrees from a long-side direction of an adjacent second vibration device in a plane.

In the first aspect and the second aspect of the present disclosure, a portion of a second main surface (second main surfaces 21*b* and 22*b*) of each second vibration device may be connected to a portion of a first main surface 31*a* of a third vibration device. Therefore, the sound apparatus 1 according to an aspect of the present disclosure may be configured so that a portion of a second main surface (for example, second main surfaces 21*b* and 22*b*) of the second vibration devices are 21 and 22 connected to a portion of a first main surface 31*a* of the third vibration device 31. For example, in a modification example aspect according to the first aspect of the present disclosure, a portion of the first main surface 31*a* of the third vibration device 31 may be connected to (or contact) a portion of each of the second main surfaces 21*b* to 24*b* of the second vibration devices 21 to 24 through (or by) an adhesive member (or adhesive layer or adhesive). In the first aspect of the present disclosure, the second vibration devices 21 to 24 may extend radially from the third vibration device 31 in a plane. In this case, a long-side direction of the second vibration devices 21 and 22 may be disposed to be parallel to a second direction (or a y-axis direction). Short sides of the second vibration device 21 and the second vibration device 22 may be disposed to be face each other with a certain space between the first vibration device 11 and the third vibration device 31 therebetween in a plane. A long-side direction of the second vibration devices 23 and 24 may be disposed to be parallel to a first direction (or an x-axis direction). Short sides of the second vibration device 23 and the second vibration device 24 may be disposed to face each other with a certain space between the first vibration device 11 and the third vibration device 31 therebetween in a plane. In a modification example aspect according to the second aspect of the present disclosure, second vibration devices may be disposed to be equal to configurations of the second vibration devices 21 and 22 in the modification example aspect according to the first aspect of the present disclosure.

Third Aspect

Figure 12:
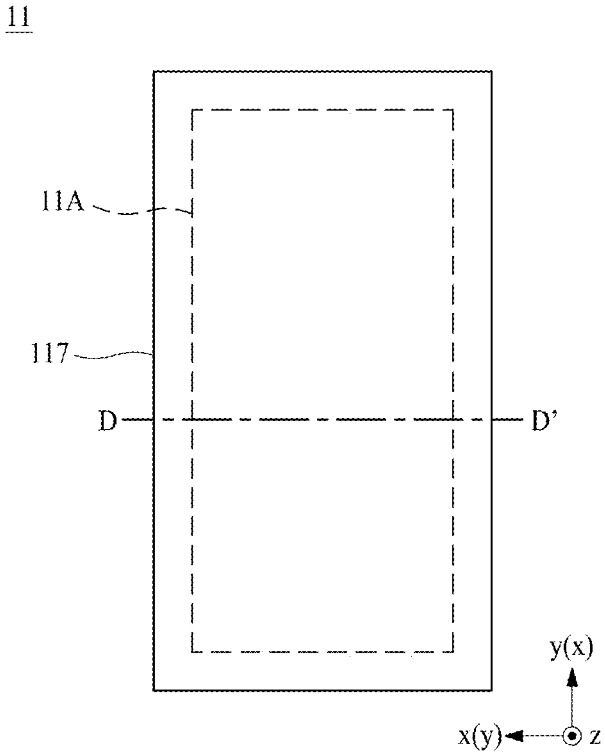
FIG. 12 is a perspective view illustrating a structure of a vibration device according to a third aspect of the present disclosure.
Figure 13:
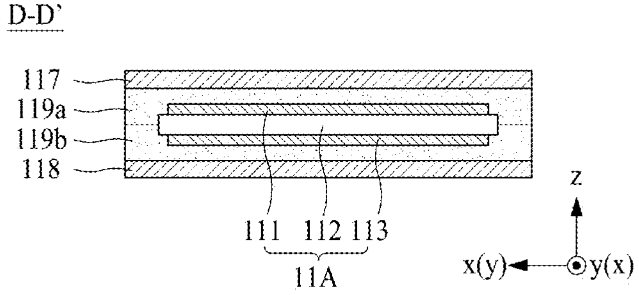
FIG. 13 is a cross-sectional view taken along line D-D' illustrated in FIG. 12 according to a third aspect of the present disclosure.

In an aspect of the present disclosure, a modification example aspect of a structure of a vibration device in the sound apparatus 1 according to the third aspect of the present disclosure will be described. FIG. 12 is a plan view illustrating a configuration of a vibration device according to an aspect of the present disclosure. FIG. 13 is a cross-sectional view along D-D' of FIG. 12 according to an aspect of the present disclosure.

As illustrated in FIGS. 12 and 13, the vibration devices 11 according to an aspect of the present disclosure may include a vibration generating part (or vibration part) 11A.

The vibration generating part 11A may include a vibration layer 112, a first electrode 111 at a first surface of the vibration layer 112, and a second electrode 113 at a second surface different from the first surface of the vibration layer 112. The vibration layer 112 may be substantially a same as the vibration layer 112 described in FIG. 6, and thus, repeated descriptions are omitted. The first electrode 111 and the second electrode 113 may be disposed with the vibration layer 112 therebetween in a thickness direction, and the first electrode 111 and the second electrode 113 may apply a voltage to the vibration layer 112. A polarization direction of the vibration layer 112 may be a forward direction (or a positive direction) of the z-axis or an opposite direction (or a negative direction) of the z-axis. Moreover, wires (or lines) configured to apply a voltage to each electrode may be connected to the electrodes 111 and 113.

The vibration device 11 according to an aspect of the present disclosure may further include a first protection layer (or first protection member) 117 and a second protection layer (or second protection member) 118. The first protection layer 117 may be connected to a first surface (or front surface or upper surface) of the vibration generating part 11A. The first protection layer 117 may protect and insulate the first surface of the vibration generating part 11A. The second protection layer 118 may be connected to a second surface (or rear surface or lower surface) of the vibration generating part 11A. The second protection layer 118 may protect and insulate the second surface of the vibration generating part 11A. For example, any one of the first protection layer 117 and the second protection layer 118 in the vibration device 11 may be connected to the vibration member through (or by) adhesive layers 119*a* and 119*b*. For example, the adhesive layers 119*a* and 119*b* may be configured in an adhesive resin material, an adhesive, or an adhesive tape, or the like, but aspects of the present disclosure are not limited thereto. The adhesive layers 119*a* and 119*b* may include epoxy-based, acryl-based, silicone-based, or urethane-based, but aspects of the present disclosure are not limited thereto.

The first protection layer 117 may be connected or coupled to the first electrode 111 by a first adhesive layer 119*a*. The second protection layer 118 may be connected or coupled to the second electrode 113 by a second adhesive layer 119*b*. The first adhesive layer 119*a* and the second adhesive layer 119*b* may be configured at a region between the first protection layer 117 and the second protection layer 118 to completely surround the vibration generating part 11A. For example, the vibration generating part 11A may be embedded or built-in at a region between the first adhesive layer 119*a* and the second adhesive layer 119*b*. For example, the first adhesive layer 119*a* and the second adhesive layer 119*b* may be a polyimide (PI) film, a polyethylene terephthalate (PET) film, or polyethylene naphthalate (PEN) film, but aspects of the present disclosure are not limited thereto.

A configuration of each of the vibration devices 21 to 24 and 31 according to an aspect of the present disclosure may be substantially a same as the third aspect of the present disclosure, and thus, its descriptions may be omitted.

Fourth Aspect

Figure 14:
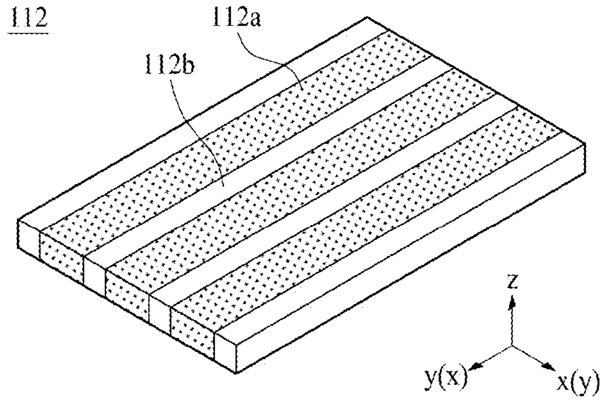
FIG. 14 is a perspective view illustrating a vibration layer of a vibration device according to a fourth aspect of the present disclosure.

In present aspect, a modification example aspect of the structure of a vibration layer in the vibration device of the sound apparatus 1 according to the fourth aspect of the present disclosure will be described. FIG. 14 is a perspective view illustrating a vibration layer in a vibration device of the sound apparatus according to an aspect of the present disclosure.

As illustrated in FIG. 14, in the vibration device 11 according to an aspect of the present disclosure, a vibration layer 112 of a vibration generating part 11A may include a plurality of first portions 112*a* and one or more second portions 112*b*. For example, the vibration layer 112 may include a plurality of first portions 112*a* and a plurality of second portions 112*b* between the plurality of first portions 112*a*. For example, the plurality of first portions 112*a* and the plurality of second portions 112*b* may be alternately and repeatedly disposed along an x-axis direction, but aspects of the present disclosure are not limited thereto.

Each of the plurality of first portions 112*a* may include an inorganic material having a piezoelectric characteristic. For example, each of the plurality of first portions 112*a* may be an inorganic material portion or a piezoelectric material portion. Each of the plurality of first portions 112*a* may have a first width parallel to the along the x-axis direction and may be extended along a y-axis direction. Each of the plurality of first portions 112*a* may be substantially a same as the vibration layer 112 described above with reference to FIG. 4, and thus, repeated descriptions may be omitted.

Each of the plurality of second portions 112*b* may be disposed at a region between the plurality of first portions 112*a*. For example, each of the plurality of first portions 112*a* may be disposed at a region between two adjacent second portions 112*b* of the plurality of second portions 112*b*. For example, the plurality of first portions 112*a* and the plurality of second portions 112*b* may include a line shape or a stripe shape which has a same size or different sizes.

Each of the plurality of second portions 112*b* may be configured to fill a gap between two adjacent first portions of the plurality of first portions 112*a*. Each of the plurality of first portions 112*a* and the plurality of second portions 112*b* may be disposed (or arranged) at a same plane (or a same layer) in parallel with each other. Each of the plurality of second portions 112*b* may absorb an impact applied to the first portions 112*a*, and thus, may enhance the durability of the first portions 112*a* and provide flexibility to the first vibration device 11 and the second vibration device 21. Each of the plurality of second portions 112*b* may include an organic material having a ductile characteristic. For example, each of the plurality of second portions 112*b* may include one or more of an epoxy-based polymer, an acrylic-based polymer, and a silicone-based polymer, but aspects of the present disclosure are not limited thereto. For example, each of the plurality of second portions 112*b* may be an organic portion, an organic material, an adhesive portion, a stretch portion, a bending portion, a damping portion, an elastic portion, an elasticity portion, or a ductile portion, or the like, but aspects of the present disclosure are not limited thereto.

A first surface of each of the plurality of first portions 112*a* and the plurality of second portions 112*b* may be connected to the first electrode in common. A second surface of each of the plurality of first portions 112*a* and the plurality of second portions 112*b* may be connected to the second electrode in common.

In the vibration device 11 of the sound apparatus 1 according to the fourth aspect of the present disclosure, the plurality of first portions 112*a* and the plurality of second portion 112*b* may be disposed on (or connected to) a same plane, and thus, the vibration layer 112 may have a single thin film-type. Accordingly, the vibration device 11 may be vibrated in a vertical direction by the first portions 112*a* having a vibration characteristic and may be bent in a curved shape by the second portions 112*b* having flexibility. For example, the vibration device 11 including the vibration layer 112 may have a 2-2 composite structure, and thus, may have a resonance frequency of 20 kHz or less, but aspects of the present disclosure are not limited thereto.

A configuration of each of the vibration devices 21 to 24 and 31 according to an aspect of the present disclosure may be substantially a same as the fourth aspect of the present disclosure, and thus, its descriptions may be omitted.

Fifth Aspect

Figure 15:
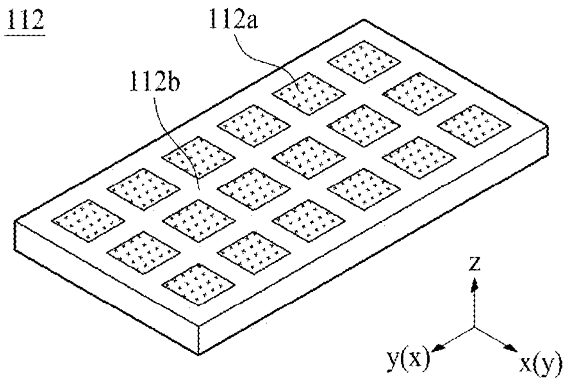
FIG. 15 is a perspective view illustrating a vibration layer of a vibration device according to a fifth aspect of the present disclosure.

In present aspect, a modification example aspect of the structure of a vibration layer in a vibration device of the sound apparatus 1 according to the fifth aspect of the present disclosure will be described. FIG. 15 is a perspective view illustrating a vibration layer in a vibration device of the sound apparatus according to an aspect of the present disclosure.

As illustrated in FIG. 15, in the vibration device 11 according to present aspect, a vibration layer 112 of the vibration generating part 11A may include a plurality of first portions 112*a* and a second portion 112*b*. For example, the vibration layer 112 may include a plurality of first portions 112*a* and a second portion 112*b* which is disposed between the plurality of first portions 112*a*.

Each of the plurality of first portions 112*a* may be disposed to be spaced apart from one another along each of an x-axis direction and a y-axis direction. For example, each of the plurality of first portions 112*a* may have a hexahedral shape having a same size and may be disposed in a lattice shape. Each of the plurality of first portions 112*a* may be substantially a same as the first portion 112*a* described above with reference to FIG. 14, and thus, repeated descriptions may be omitted.

The second portion 112*b* may be disposed between the plurality of first portions 112*a* along each of the x-axis direction and the y-axis direction. The second portion 112*b* may be configured to fill a gap or a space between two adjacent first portions 112*a* or to surround each of the plurality of first portions 112*a*, and thus, the second portion 112*b* may be connected to or attached on lateral surface of adjacent first portion 112*a*. The second portion 112*b* may be substantially a same as the second portions 112*b* described above with reference to FIG. 14, and thus, repeated descriptions may be omitted.

A first surface of each of the plurality of first portions 112*a* and the second portion 112*b* may be connected to a first electrode in common. A second surface of each of the plurality of first portions 112*a* and the second portion 112*b* may be connected to a second electrode in common.

In the vibration device 11 of the sound apparatus according to the fifth aspect of the present disclosure, the plurality of first portions 112*a* and the second portion 112*b* may be disposed on (or connected to) a same plane, and thus, the vibration layer 112 may have a single thin film-type. Accordingly, the vibration device 11 may be vibrated in a vertical direction by the first portions 112*a* having a vibration characteristic and may be bent in a curved shape by the second portions 112*b* having flexibility. For example, the vibration device 11 including the vibration layer 112 may have a 1-3 composite structure, and thus, may have a resonance frequency of 20 kHz or less, but aspects of the present disclosure are not limited thereto.

A configuration of each of the vibration devices 21 to 24 and 31 according to an aspect of the present disclosure may be substantially a same as the fifth aspect of the present disclosure, and thus, its descriptions may be omitted.

Sixth Aspect

In an aspect of the present disclosure, a detailed configuration example will be described where the sound apparatus 1 according to the first aspect of the present disclosure is a display apparatus and the vibration member 90 performs a function of a display panel of the display apparatus. Descriptions of common elements which are a same as the first aspect of the present disclosure may be omitted or will be briefly given below.

Figure 16:
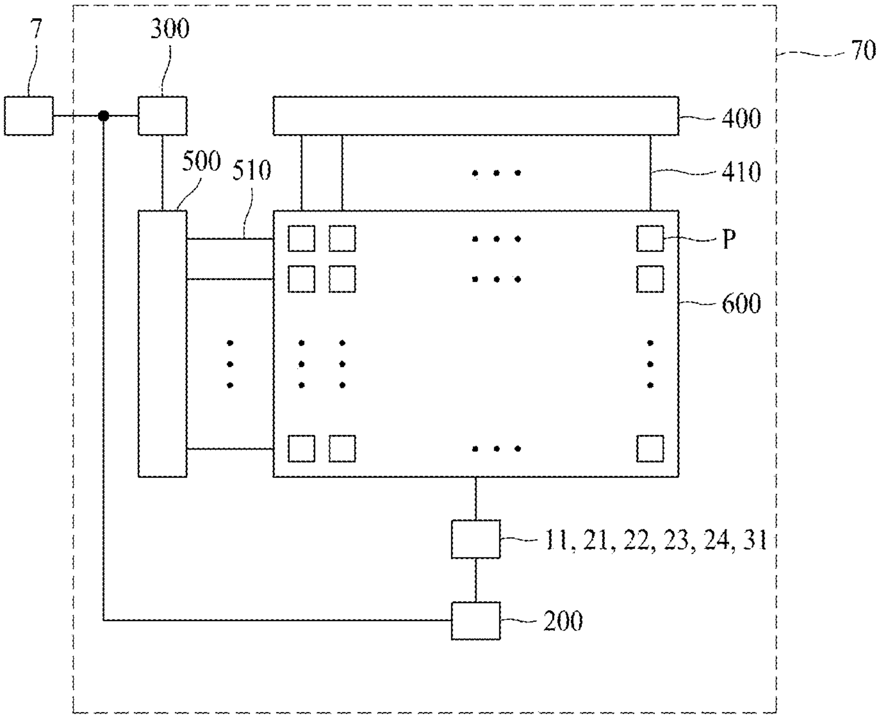
FIG. 16 illustrates a configuration of a display apparatus according to a sixth aspect of the present disclosure.

FIG. 16 illustrates a display apparatus 70 according to the tenth aspect of the present disclosure. The display apparatus 70 according to an aspect of the present disclosure may be, for example, electronic posters, digital bulletin boards, electronic advertisement signboards, computer screens, or television receivers, or the like, but aspects of the present disclosure are not limited thereto. A host system 7 and a structure of a first vibration device 11, second vibration devices 21 to 24, and a third vibration device 31 may be substantially a same as the first aspect of the present disclosure, and thus, descriptions may be omitted. Moreover, elastic members 41 to 44 or the like according to the first aspect of the present disclosure may be connected to the first vibration device 11, the second vibration devices 21 to 24, and the third vibration device 31.

As illustrated in FIG. 16, the display apparatus 70 may include a sound apparatus including the first vibration device 11, the second vibration devices 21 to 24, and the third vibration device 31, a controller 200, a panel controller 300, a data driving circuit 400, a gate driving circuit 500, and a display panel 600. The display apparatus 70 may be an apparatus which displays an image by a display panel 600 based on RGB data (or RGBW data) or the like input thereto and generates a sound based on a driving signal or the like input thereto.

The panel controller 300 may control the data driving circuit 400 and the gate driving circuit 500 based on image data and a timing signal input from the host system 7. The data driving circuit 400 may supply data voltages or the like to a plurality of pixels P through a driving line 410 disposed at each column of the plurality of pixels P. The gate driving circuit 500 may supply a control signal to the plurality of pixels P through a driving line 510 disposed at each row of the plurality of pixels P. Moreover, each of the driving line 410 and the driving line 510 may be provided in a plurality wires (or lines).

The display panel 600 may include the plurality of pixels P disposed to configure a plurality of rows and a plurality of columns. When the display apparatus 60 displays a color image, the pixel P may be a subpixel which displays any one of a plurality of colors (for example, RGB or RGBW data) implementing a color image.

The display panel 600 used to one or more aspects of the present disclosure may use all types (or shapes) of display panels such as a liquid crystal display panel, an organic light emitting display panel, and an electroluminescent display panel, or the like. But aspects of the present disclosure are not limited thereto. The display panel 600 may be a display panel which is vibrated by a sound apparatus according to an aspect of the present disclosure to generate a sound. A types (or shapes) or a size of a display panel 600 applied to a display apparatus 70 according to an aspect of the present disclosure may not limited.

According to one or more aspects of the present disclosure, when the display panel 600 is the liquid crystal display panel, the display panel 600 may include a plurality of gate lines, a plurality of data lines, and a plurality of pixels respectively provided at each of intersection regions of the gate lines and the data lines. In addition, the display panel 600 may include an array substrate including a thin film transistor (TFT) which is a switching element for adjusting a light transmittance of each of the plurality of pixels P, an upper substrate including a color filter and/or a black matrix or the like, and a liquid crystal layer between the array substrate and the upper substrate.

When the display panel 600 is the organic light emitting display panel, the display panel 600 may include a plurality of gate lines, a plurality of data lines, and a plurality of pixels respectively provided at each of intersection regions of the gate lines and the data lines. In addition, the display panel 600 may include an array substrate including a TFT which is an element for selectively applying a voltage to each of the pixels P, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Moreover, a layer formed on the array substrate may include an inorganic light emitting layer (for example, a nano-sized material layer, a quantum dot light emitting layer, or the like). As another aspect of the present disclosure, the layer formed on the array substrate may include a micro light emitting diode.

The display panel 600 may further include a backing such as a metal plate attached on the display panel 600. However, the display panel 600 may include other structures, for example, other structures made of different materials.

Each of the controller 200, the panel controller 300, the data driving circuit 400, and the gate driving circuit 500 may be configured by one semiconductor IC or a plurality of semiconductor integrated circuits. Moreover, some or all of the controller 200, the panel controller 300, the data driving circuit 400, and the gate driving circuit 500 may be integrally configured as one semiconductor integrated circuit (or one body or a single body).

The display apparatus 60 according to an aspect of the present disclosure may be supplied with an image signal (for example, RGB data or RGBW data), a driving signal and a timing signal (a vertical synchronization signal, a horizontal synchronization signal, and a data enable signal, or the like) from the host system 7, and thus, may display an image or/simultaneously may generate a sound. The display panel 600 may include an image display surface configured to display an image and a rear surface (or a backside surface) which is opposite to the image display surface. The vibration devices 21-24 and 31 may be connected to the rear surface of the display panel 600. Therefore, the display panel 600 may include a function of displaying an image and a function of the vibration member 90 of the first to tenth aspects of the present disclosure. In the present aspect, the display apparatus 60 having an acoustic effect where a sound may be generated (or output) from an image displayed by the display panel 600 may be provided. For example, vibrations of the plurality of vibration devices 11, 21-24 and 31 may be transferred to the rear surface of the display panel 600. For example, the display panel 600 vibrates based on vibrations transferred by the plurality of vibration devices 11, 21-24 and 31. Thus, the sound may be output (or generated) from an image displayed on the image display surface of the display panel 600.

A sound apparatus according to an aspect of the present disclosure may be applied to a sound apparatus disposed or included at an apparatus. The apparatus according to an aspect of the present disclosure may be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game apparatuses, notebook computers, monitors, cameras, camcorders, home appliances, etc. Moreover, the sound apparatus according to an aspect of the present disclosure may be applied to or included into organic light-emitting lighting apparatuses or inorganic light-emitting lighting apparatuses. When the sound apparatus of an aspect of the present disclosure is applied to or included into lighting apparatuses, the lighting apparatus may act as lighting and a speaker. Furthermore, when the sound apparatus of an aspect of the present disclosure is applied to or included into a mobile device, or the like, the sound apparatus may act as one or more of a speaker, a receiver, and a haptic apparatus, but aspects of the present disclosure are not limited thereto.

A sound apparatus according to an aspect of the present disclosure will be described below.

A sound apparatus according to an aspect of the present disclosure may comprise a vibration member having a plate shape; and a first vibration device, a plurality of second vibration devices, and a third vibration device configured to each have a plate shape including a first main surface and a second main surface opposite to each other and configured to vibrate based on a driving signal input thereto. The first main surface of the first vibration device may be connected to the vibration member, a portion of the second main surface of the first vibration device and a portion of the first main surface of the third vibration device may be connected to each other through (or by) an elastic member so that the first main surface of the third vibration device is spaced apart from and opposite to the second main surface of the first vibration device by a certain distance. A portion of each of the plurality of second vibration devices may be connected to a portion of the third vibration device and a portion of the first main surface of each of the plurality of second vibration devices may be connected to a portion of the vibration member through (or by) an elastic member, so that the plurality of second vibration devices extend radially from the third vibration device in a plane. A driving signal input to the first vibration device may have a phase opposite to a phase of a driving signal input to the third vibration device.

According to one or more aspects of the present disclosure, the driving signal input to the third vibration device may have a same phase as a phase of a driving signal input to the plurality of second vibration devices.

According to one or more aspects of the present disclosure, the plurality of second vibration devices may be disposed to be rotation-symmetric with respect to an axis perpendicular to the first main surface and the second main surface of the third vibration device.

According to one or more aspects of the present disclosure, the portion of each of the plurality of second vibration devices connected to the third vibration device may be different from the portion of the first main surface of each of the plurality of second vibration devices in a plane.

According to one or more aspects of the present disclosure, a portion of the second main surface of each of the plurality of second vibration devices may be connected to a portion of the first main surface of the third vibration device.

According to one or more aspects of the present disclosure, the plurality of second vibration devices may be connected to the third vibration device by an adhesive member.

According to one or more aspects of the present disclosure, the plurality of second vibration devices may not overlap each other in a plane.

According to one or more aspects of the present disclosure, the number of second vibration devices may be two or more, or the number of second vibration devices may be four or more.

According to one or more aspects of the present disclosure, the first vibration device may have a same shape as the plate shape of the third vibration device. The second main surface of the first vibration device may be covered by the third vibration device in a plane.

According to one or more aspects of the present disclosure, the second main surface of the first vibration device and the first main surface of the third vibration device may have a rectangular shape. The portion of the second main surface of the first vibration device and the portion of the first main surface of the third vibration device may be corner portions of the rectangular shape.

According to one or more aspects of the present disclosure, the first main surface of the first vibration device may contact the vibration member.

According to one or more aspects of the present disclosure, the first vibration device may connect the vibration member by an adhesive member.

According to one or more aspects of the present disclosure, the first vibration device may not directly contact the second vibration device.

According to one or more aspects of the present disclosure, the first vibration device may overlap the portion of the second vibration device connected to the third vibration device in a plane.

According to one or more aspects of the present disclosure, at least one of the first vibration device, the second vibration device, and the third vibration device may be a piezoelectric device.

A sound apparatus according to one or more aspects of the present disclosure may comprise a vibration member, a first vibration device connected to the vibration member, a third vibration device overlapping the first vibration device, a plurality of second vibration devices connected to the vibration member and connected to the third vibration device between the first vibration device and the third vibration device to be spaced apart from the first vibration device, a plurality of elastic members connected between the vibration member and each of the plurality of second vibration devices, and a plurality of connection members connected between the first vibration device and the third vibration device. A driving signal input to the first vibration device may have a phase different from a phase of a driving signal input to the third vibration device.

According to one or more aspects of the present disclosure, the driving signal input to the third vibration device may have a same phase as a phase of a driving signal input to the plurality of second vibration devices.

According to one or more aspects of the present disclosure, an entire surface of the first vibration device may be connected to the vibration member by an adhesive member.

According to one or more aspects of the present disclosure, each of the plurality of second vibration devices may comprise a first end portion connected to the vibration member by the elastic member corresponding thereto, and a second end portion connected to the third vibration device by the connection member corresponding thereto.

According to one or more aspects of the present disclosure, the vibration member includes at least one material of a metal, resin, glass, wood, rubber, plastic, fiber, cloth, paper, leather, or carbon. The vibration member may be at least one of a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular glass window, a vehicular exterior material, a vehicular seat interior material, a vehicular ceiling material, a building ceiling material, a building interior material, a building glass window, an aircraft interior material, an aircraft glass window, and a mirror.

According to one or more aspects of the present disclosure, the vibration member may be a display panel of a display apparatus. The display panel may include an image display surface on which an image is displayed, and a rear surface opposite to the image display surface. Vibrations generated by the first vibration device, the second vibration device, and the third vibration device may be transferred to the rear surface of the display panel.

According to one or more aspects of the present disclosure, the display panel may vibrate based on vibrations generated by one or more of the first vibration device, the second vibration device, and the third vibration device. A sound may be output from an image displayed on the display panel.

According to one or more aspects of the present disclosure, each of the first vibration device, the plurality of second vibration devices, and the third vibration device may comprise: a first electrode; a second electrode; a vibration layer disposed between the first electrode and the second electrode; a first protection member disposed above the first electrode; and a second protection member disposed under the second electrode. The first electrode and the second electrode may apply a voltage corresponding to the driving signal to the vibration layer.

According to one or more aspects of the present disclosure, the first protection member may connect the first electrode by a first adhesive layer. The second protection member may connect the second electrode by a second adhesive layer. The adhesive layer and the second adhesive layer may surround the first electrode, the second electrode and the vibration layer.

According to one or more aspects of the present disclosure, the vibration layer may comprise a plurality of first portions and one or more second portions between the plurality of first portion. A first surface of each of the plurality of first portions and the one or more second portions may be connected to the first electrode in common. A second surface of each of the plurality of first portions and the one or more second portions may be connected to the second electrode in common. Each of the plurality of first portions may include an inorganic material having a piezoelectric characteristic, and each of the one or more second portions may include an organic material having a ductile characteristic.

According to one or more aspects of the present disclosure, the plurality of first portions and the one or more second portions may be alternately and repeatedly disposed along a short side direction of the vibration layer, or each of the plurality of first portions may be disposed in a lattice shape.

It will be apparent to those skilled in the art that various modifications and variations may be made in the present disclosure without departing from the scope of the disclosures. Thus, it is intended that the present disclosure covers the modifications and variations of this disclosure that come within the scope of the appended claims and their equivalents.

What is claimed is:

1. A sound apparatus, comprising:

a vibration member having a plate shape; and a first vibration device, a plurality of second vibration devices, and a third vibration device configured to each have a plate shape including a first main surface and a second main surface opposite to each other and configured to vibrate based on a driving signal input thereto, wherein the first main surface of the first vibration device is connected to the vibration member, wherein a portion of the second main surface of the first vibration device and a portion of the first main surface of the third vibration device are connected to each other by an elastic member so that the first main surface of the third vibration device is spaced apart from and opposite to the second main surface of the first vibration device by a certain distance, wherein a portion of each of the plurality of second vibration devices is connected to a portion of the third vibration device and a portion of the first main surface of each of the plurality of second vibration devices is connected to a portion of the vibration member by an elastic member, so that the plurality of second vibration devices extend radially from the third vibration device in a plane, and wherein a driving signal input to the first vibration device has a phase opposite to a phase of a driving signal input to the third vibration device.

2. The sound apparatus of claim 1, wherein the driving signal input to the third vibration device has a same phase as a phase of a driving signal input to the plurality of second vibration devices.

3. The sound apparatus of claim 1, wherein the plurality of second vibration devices are disposed to be rotation-symmetric with respect to an axis perpendicular to the first main surface and the second main surface of the third vibration device.

4. The sound apparatus of claim 3, wherein the portion of each of the plurality of second vibration devices connected to the third vibration device is different from the portion of the first main surface of each of the plurality of second vibration devices in a plane.

5. The sound apparatus of claim 4, wherein a portion of the second main surface of each of the plurality of second vibration devices is connected to a portion of the first main surface of the third vibration device.

6. The sound apparatus of claim 5, wherein the plurality of second vibration devices are connected to the third vibration device by an adhesive member.

7. The sound apparatus of claim 3, wherein the plurality of second vibration devices do not overlap each other in a plane.

8. The sound apparatus of claim 7, wherein the number of second vibration devices is two or more, or the number of second vibration devices is four or more.

9. The sound apparatus of claim 1, wherein the first vibration device has a same shape as the plate shape of the third vibration device, and wherein the second main surface of the first vibration device is covered by the third vibration device in a plane.

10. The sound apparatus of claim 9, wherein the first main surface of the first vibration device contacts the vibration member.

11. The sound apparatus of claim 10, wherein the first vibration device connects the vibration member by an adhesive member.

12. The sound apparatus of claim 10, wherein the first vibration device does not directly contact the second vibration device.

13. The sound apparatus of claim 12, wherein the first vibration device overlaps the portion of the second vibration device connected to the third vibration device in a plane.

14. The sound apparatus of claim 1, wherein the second main surface of the first vibration device and the first main surface of the third vibration device have a rectangular shape, and wherein the portion of the second main surface of the first vibration device and the portion of the first main surface of the third vibration device are corner portions of the rectangular shape.

15. The sound apparatus of claim 1, wherein at least one of the first vibration device, the second vibration device, and the third vibration device is a piezoelectric device.

16. The sound apparatus of claim 1, wherein the vibration member includes at least one material of a metal, resin, glass, wood, rubber, plastic, fiber, cloth, paper, leather, and carbon, and wherein the vibration member is at least one of a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular glass window, a vehicular exterior material, a vehicular seat interior material, a vehicular ceiling material, a building ceiling material, a building interior material, a building glass window, an aircraft interior material, an aircraft glass window, and a mirror.

17. The sound apparatus of claim 1, wherein the vibration member is a display panel of a display apparatus, wherein the display panel includes an image display surface on which an image is displayed, and a rear surface opposite to the image display surface, and wherein vibrations generated by the first vibration device, the second vibration device, and the third vibration device are transferred to the rear surface of the display panel.

18. The sound apparatus of claim 17, wherein the display panel vibrates based on vibrations generated by one or more of the first vibration device, the second vibration device, and the third vibration device, and wherein a sound is output from an image displayed on the display panel.

19. The sound apparatus of claim 1, wherein each of the first vibration device, the plurality of second vibration devices, and the third vibration device comprises:

a first electrode;

a second electrode;

a vibration layer disposed between the first electrode and the second electrode;

a first protection member disposed above the first electrode; and a second protection member disposed under the second electrode, and wherein the first electrode and the second electrode apply a voltage corresponding to the driving signal to the vibration layer.

20. The sound apparatus of claim 19, wherein the first protection member connects the first electrode by a first adhesive layer, the second protection member connects the second electrode by a second adhesive layer, and the adhesive layer and the second adhesive layer surround the first electrode, the second electrode and the vibration layer.

21. A sound apparatus, comprising:
- a vibration member;
- a first vibration device connected to the vibration member;
- a third vibration device overlapping the first vibration device;
- a plurality of second vibration devices connected to the vibration member and connected to the third vibration device between the first vibration device and the third vibration device so as to be spaced apart from the first vibration device;
- a plurality of elastic members connected between the vibration member and each of the plurality of second vibration devices; and
- a plurality of connection members connected between the first vibration device and the third vibration device,
- wherein a driving signal input to the first vibration device has a phase different from a phase of a driving signal input to the third vibration device.

22. The sound apparatus of claim 21, wherein the driving signal input to the third vibration device has a same phase as a phase of a driving signal input to the plurality of second vibration devices.

23. The sound apparatus of claim 21, wherein an entire surface of the first vibration device is connected to the vibration member by an adhesive member.

24. The sound apparatus of claim 21, wherein each of the plurality of second vibration devices comprises:
- a first end portion connected to the vibration member by the elastic member corresponding thereto; and
- a second end portion connected to the third vibration device by the connection member corresponding thereto.

25. The sound apparatus of claim 21, wherein the vibration member includes at least one material of a metal, resin, glass, wood, rubber, plastic, fiber, cloth, paper, leather, and carbon, and
- wherein the vibration member is at least one of a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular glass window, a vehicular exterior material, a vehicular seat interior material, a vehicular ceiling material, a building ceiling material, a building interior material, a building glass window, an aircraft interior material, an aircraft glass window, and a mirror.

26. The sound apparatus of claim 21, wherein the vibration member is a display panel of a display apparatus,
- wherein the display panel includes an image display surface on which an image is displayed, and a rear surface opposite to the image display surface, and
- wherein vibrations generated by the first vibration device, the second vibration device, and the third vibration device are transferred to the rear surface of the display panel.

27. The sound apparatus of claim 26, wherein the display panel vibrates based on vibrations generated by one or more of the first vibration device, the second vibration device, and the third vibration device, and
- wherein a sound is output from an image displayed on the display panel.

28. The sound apparatus of claim 21, wherein each of the first vibration device, the plurality of second vibration devices, and the third vibration device comprises:
- a first electrode;
- a second electrode;
- a vibration layer disposed between the first electrode and the second electrode;
- a first protection member disposed above the first electrode; and
- a second protection member disposed under the second electrode, and
- wherein the first electrode and the second electrode apply a voltage corresponding to the driving signal to the vibration layer.

29. The sound apparatus of claim 28, wherein the first protection member connects the first electrode by a first adhesive layer, the second protection member connects the second electrode by a second adhesive layer, and the adhesive layer and the second adhesive layer surround the first electrode, the second electrode and the vibration layer.

* * * * *